(12) United States Patent
Eichstaedt et al.

(10) Patent No.: US 7,769,614 B2
(45) Date of Patent: Aug. 3, 2010

(54) SYSTEMS AND METHODS FOR PROVIDING COMPONENT INFORMATION IN COLLABORATIVE DESIGN, CONSTRUCTION, AND MAINTENANCE OF FLUID PROCESSING PLANTS

(75) Inventors: John C. Eichstaedt, Baton Rouge, LA (US); Benedict A. Eazzetta, Burlingame, CA (US); Robert L. Mullenger, Mountain View, CA (US); Shawn A. Wentz, Redwood City, CA (US); Hans T. Erickson, Mountain View, CA (US)

(73) Assignee: Intergraph Technologies Company, Las Vegas, NV (US)

( * ) Notice: Subject to any disclaimer, the term of this patent is extended or adjusted under 35 U.S.C. 154(b) by 1494 days.

(21) Appl. No.: 11/094,598

(22) Filed: Mar. 30, 2005

(65) Prior Publication Data

US 2005/0172260 A1 Aug. 4, 2005

Related U.S. Application Data

(62) Division of application No. 09/843,344, filed on Apr. 25, 2001, now Pat. No. 7,188,072.

(60) Provisional application No. 60/211,285, filed on Jun. 13, 2000, provisional application No. 60/211,254, filed on Jun. 13, 2000, provisional application No. 60/228,016, filed on Aug. 24, 2000, provisional application No. 60/264,792, filed on Jan. 29, 2001.

(51) Int. Cl.
*G06F 9/44* (2006.01)
(52) U.S. Cl. .......................................................... 705/7
(58) Field of Classification Search ...................... 705/7
See application file for complete search history.

(56) References Cited

U.S. PATENT DOCUMENTS 4,181,954 A 1/1980 Rosenthal et al. ........... 364/520

(Continued)

FOREIGN PATENT DOCUMENTS

DE 19640296 A1 4/1998

(Continued)

OTHER PUBLICATIONS

Coury et al ( Alpha numeric and graphic displays for dynamic processing monitoring and control), Dec. 1989, Ergonomics, vol. 32. No. 11, pp. 1-17.*

(Continued)

*Primary Examiner*—Romain Jeanty
(74) *Attorney, Agent, or Firm*—Sunstein Kann Murphy & Timbers LLP

(57) ABSTRACT

Systems and methods for the collaborative design, construction, and maintenance of fluid processing plants are provided. A collaborative commerce application may provide project management utilities, visualization utilities, dynamic pricing utilities, material procurement utilities, and certification utilities. These features may be integrated seamlessly into the collaborative commerce application. Communication among project team members in the design and construction of fluid processing plants may be made more efficient by providing automatic notifications via the collaborative commerce application. Version control may be used to ensure project team members are working with the latest designs and revisions. Access controls and other security features may be used to prevent confidential data from being disseminated unnecessarily.

15 Claims, 29 Drawing Sheets

U.S. PATENT DOCUMENTS

| | | | | |
|---|---|---|---|---|
| 5,758,327 | A | 5/1998 | Gardner et al. | 705/26 |
| 5,765,138 | A | 6/1998 | Aycock et al. | 705/7 |
| 5,877,961 | A | 3/1999 | Moore | 364/474.22 |
| 6,115,690 | A | 9/2000 | Wong et al. | 705/7 |
| 6,128,626 | A | 10/2000 | Beauchesne | 707/104 |
| 6,230,066 | B1 | 5/2001 | Sferro et al. | 700/104 |
| 6,289,254 | B1 | 9/2001 | Shimizu et al. | 707/5 |
| 6,295,513 | B1 | 9/2001 | Thackston | 703/1 |
| 6,327,588 | B1 | 12/2001 | Danish et al. | 707/3 |
| 6,581,040 | B1 | 6/2003 | Wright et al. | 705/8 |
| 6,647,373 | B1 | 11/2003 | Carlton-Foss | 705/37 |
| 6,668,254 | B2 | 12/2003 | Matson et al. | 707/10 |
| 6,684,219 | B1 | 1/2004 | Shaw et al. | 707/103 R |
| 6,810,383 | B1 | 10/2004 | Loveland | 705/9 |
| 6,850,900 | B1 | 2/2005 | Hare et al. | 705/26 |
| 6,928,396 | B2 | 8/2005 | Thackston | 703/1 |
| 7,003,729 | B1 | 2/2006 | Rajala et al. | 715/762 |

FOREIGN PATENT DOCUMENTS

| | | |
|---|---|---|
| JP | 08287121 | 11/1996 |
| WO | WO 97/15877 | 5/1997 |
| WO | WO 9849640 A1 | 11/1998 |

OTHER PUBLICATIONS

Shu (Groupware Experiences in Three-Dimensional Computer-Aided Design), Dec. 1992, CSCW, pp. 1-8.*

Design Power, Inc., PlantWise Intelligent Solutions for Optimizing Plant Design, AutoRouter 2.0, manipulating pipeways and equipment, allows users to interactively edit routed pipe-runs, 2 pages and 3 more pages about Plantwise Demo and AutoRouter, Jul. 21, 1999.

Okura Osamu, Computer supporting plant engineering. Utilization of 3D Modeling System in early stage basic design, Piping Engineering, vol. 41, No. 5, p. 1-5, 1999, 1 page of abstract.

Byrnes, David, *Plant design software: new and improved for 1997*, online http://www.cadsystems.com/software/ 9709f05.html, retrieved Feb. 5, 2003, 4 pages.

Authorized Officer J. Triest, *International Search Report*, European Patent Office, Completed Feb. 5, 2003, 2 pages.

* cited by examiner

```
FILE>>                                                    LINK>>  ADDRESS
                                                    • EDIT PROFILE
iNDUSTRIA                                           • CUSTOMER SERVICE
                                                    • HELP
( HOME | RFQ | CATALOG | CURRENT REQUISITION ) ( ORDER STATUS | FAVORITES ) LOG OFF
                                                                                    ─ 165
SESSION USER: TEST FOUR

IF YOU ARE BEGINNING A NEW ORDER, USE THE SEARCH OPTIONS BELOW TO FIND PRODUCTS. IF YOU ARE
RETURNING TO WORK ON AN EXISTING ORDER, BEGIN BY GOING TO THE ORDER STATUS SECTION.

SEARCH                                                                         NEED HELP?
PLEASE ENTER THE FOLLOWING INFORMATION, CLICK ON THE SEARCH
                                                          ─175
       SITE STANDARD OR SITE PART NUMBER:   SUPPLIER CATALOG NUMBER:       (SEARCH)
167 ─ [g62e OR 100090]      173 ─           [                    ]
                                                                              171 ─
       KEYWORD SEARCH:              MANUFACTURER PART NUMBER:    SUPPLIER LISTING:
       [NACE AND KITZ]              [V265F]                      [STUART CLRBY CO  ▲]
                                                                 [VALIN             ]
169 ─ FOR MORE POWERFUL SEARCH OPTIONS, CLICK ON THE CATEGORY SEARCH.  [VAN LEEUWEN PIPE AND TUBE CORP.]
                                                                 [EFILTRATION     ▼]

RFQ                                                                            NEED HELP?
YOU CAN ADD UP TO TEN PRODUCTS TO AN RFQ AT A TIME. CLICK ON THE RFQ BUTTON TO ADD PRODUCTS TO AN RFQ.
                                                                                    (RFQ)

⊕ INTERNET
```

FIG. 11B

| FILE » | ← → ⊗ ⌂ ⟲ | | | | LINK » | ADDRESS |

○ EDIT PROFILE
○ CUSTOMER SERVICE
○ HELP iNDUSTRIA

( HOME | RFQ | CATALOG | CURRENT REQUISITION | ORDER STATUS | FAVORITES | LOG OFF )

CATEGORY SEARCH: PIPING VALVE-GATE                                        NEED HELP?

PLEASE ENTER THE FOLLOWING INFORMATION AND CLICK ON THE SEARCH BUTTON:
SITE STANDARD OR SITE PART NUMBER:    SUPPLIER CATALOG NUMBER:    SUPPLIER LISTING:
                                                                  ALL SUPPLIERS
                                                                  A&B STAINLESS VALVE INC.
                                                                  ABB AUTOMATION
KEYWORD SEARCH:                        MANUFACTURER PART NUMBER:  AWC INC.

( SEARCH )

CATEGORY SPECIFIC SEARCHING MAKES IT EASIER TO NARROW YOUR SEARCH FOR PRODUCTS. TRY USING THESE
ATTRIBUTES TO FURTHER REFINE YOUR QUERY.

TYPE:                              SIZE (INCHES):              MANUFACTURER
BOLTED BONNET          ▷           6                    ▷      —— ANY ——         ▷
CONNECTION:                        RATING:                     STEM ACTION:
FLANGED (FLG)          ▷           150#                 ▷      —— ANY ——         ▷
BODY MATERIAL:                     BODY MATERIAL SPEC/GRADE:   SEAT MATERIAL:
304 STAINLESS STEEL (SS) ▷         —— ANY ——            ▷      —— ANY ——         ▷
DISC TYPE:                         DISC MATERIAL:              TRIM MATERIAL:
—— ANY ——              ▷           —— ANY ——            ▷      —— ANY ——         ▷
STEM MATERIAL:                     PACKING/STEM SEAL:          LINING:
—— ANY ——              ▷           —— ANY ——            ▷      —— ANY ——   ▷  —— ANY ——
OPERATOR:                          SPECIAL REQUIREMENT         EPOXY
—— ANY ——              ▷           NACE MR-01-75              FEP
                                                               NYLON
                                                               PFA
                                                               POLYPROPYLENE
                                                               TEFLON (PTFE)
                                                               OTHER

NET

PART: VALVE
MANUFACTURER: VOGT
MANUFACTURER PART NUMBER: 123456
SUPPLIER: MCJUNKIN
SUPPLIER PART NUMBER: ABC123
MMS PART NUMBER: A1B2C3
DUPONT PART NUMBER: UVWXYZ
TYPE: GATE
BODY: A216 WCB
RATING: 150#
SIZE: 6"
BONNET: BOLTED
END: FLANGE
SEAT: 13% CHROME
PACKING: GRAFOIL

174

SEARCH TYPE — 176
☒ QUICK ORDER (PART NUMBERS) — 178
☐ KEYWORD — 180
☐ CATEGORY — 182
DYNAMIC PRICING — 184
☐ REQUEST FOR QUOTE
☐ REVERSE AUCTION
☐ AUCTION
OTHER
☐ BUILD SPECIFICATION SHEET
ATTRIBUTES — 186
☐ PART: VALVE
☐ MANUFACTURER: VOGT
☐ MANUFACTURER PART NUMBER: 123456
☐ SUPPLIER: MCJUNKIN
☒ SUPPLIER PART NUMBER: ABC123
☐ MMS PART NUMBER: A1B2C3
☐ DUPONT PART NUMBER: UVWXYZ

☐ TYPE: GATE
☐ BODY: A216WCB
☐ RATING: 150#
☐ SIZE: 6"
☐ BONNET: BOLTED
☐ END: FLANGE
☐ SEAT: 13% CHROME
☐ PACKING: GRAFOIL

FIG. 12B

FIG. 14 iNDUSTRIA

SEARCH | RFQ | VIEW REQUISITION | CHECKOUT | ORDER STATUS | FAVORITES | EDIT PROFILE | LOG OFF

SEARCH RESULTS: VALVES

- IF YOUR SEARCH RETURNED TOO MANY PRODUCTS, TRY TO REFINE YOUR SEARCH.
- TO ADD PRODUCT TO YOUR CURRENT ORDER, SIMPLY CLICK ON THE CHECK BOX NEXT TO THE ITEM, THEN CLICK ON THE ADD TO REQUISITION BUTTON.
- TO ORDER MORE THAN ONE UNIT, CHANGE THE QUANTITY BEFORE CLICKING THE ADD TO REQUISITION BUTTON.

DISPLAYING 1 - 4 OF 4 VALVES FOUND.

YOU CAN ALSO CLICK ON AN UNDERLINED COLUMN TITLE TO SORT YOUR SEARCH RESULTS.

| PREFERRED SUPPLIER | PRODUCT NAME | CAT# | AMOUNT | PRICE | QTY |
|---|---|---|---|---|---|
| ☐ MCJUNKIN COPORATION/THE WM. POWELL COMPANY | 10 POWELL 1793 125# CAST IRON BOLTED BONNET OUTSIDE SCREW & YOKE GATE VALVE FLANGED END TRIM: BRONZE SEAT: BRONZE PACKING: GRAFOIL HANDWHEEL | 08104735 | 1 EA | $2,856.50 | [0] |
| ☐ MCJUNKIN COPORATION/THE WM. POWELL COMPANY | 10 POWELL 1793 125# CAST IRON BOLTED BONNET OUTSIDE SCREW & YOKE GATE VALVE FLANGE END TRIM: BRONZE PACKING: NON-ASBESTOS HANDWHEEL | 08104883 | 1 EA | $2,856.50 | [0] |
| ☐ MCJUNKIN COPORATION/KITZ CORPORATION | 10 KITZ 72125FCL 125# CAST IRON BOLTED BONNET OUTSIDE SCREW & YOKE GATE VALVE FLANGED END TRIM: BRONZE HANDWHEEL | 08502196 | 1 EA | $1,581.00 | [0] |
| ☐ MCJUNKIN COPORATION/ MILWAUKEE VALVE COMPANY | 10 WAUKEE F-2885 125# CAST IRON BOLTED BONNET OUTSIDE SCREW & YOKE GATE VALVE FLANGED END TRIM: BRONZE SEAT: BRONZE PACKING: NON-ASBESTOS HANDWHEEL | 08711275 | 1 EA | $3,035.55 | [0] |

[ADD TO REQUISITION] [ADD TO FAVORITES] [RESET]

DISPLAYING 1 - 4 OF 4 VALVES FOUND.

FIG. 19A

| | | A&B STAINLESS | MCJUNKIN | MCJUNKIN | WILSON | VAN LUWEEN RECOMMEND | VAN LUWEEN BID 2 |
|---|---|---|---|---|---|---|---|
| HEADER SUMMARY INFORMATION | | BID 1 | BID 1 | ALT 1 | BID 1 | BID 1 | ALT 1 |
| PROPOSAL NUMBER | | | | | | | |
| TECHNICALLY ACCEPTABLE (CHECK BOX IF YES) | | ☐ | ☐ | ☐ | ☐ | ☐ | ☐ |
| CURRENCY | | USD | USD | SGD | USD | USD | SGD |
| PRICE | | 50,000 | 47,000 | 52,000 | 53,000 | 46,500 | 51,000 |
| (PERCENT) | | 0.00% | 1.00% | 1.50% | 0.00% | 1.00% | 1.25% |
| | | 50,000 | 16,530 | 51,220 | 53,000 | 46,035 | 50,363 |
| CHARGES | | 250 | 0 | 0 | 0 | 0 | 0 |
| POINT | | CIRCLEVILLE, OH | CHARLESTON, WV | CHARLESTON, WV | HOUSTON, TX | CIRCLEVILLE, OH | CIRCLEVILLE, OH |
| FREIGHT CHARGES TO BUYER | | 1,400 | 1,500 | 1,500 | 1,000 | 1,100 | 1,100 |
| TOTAL EVALUATED COST TO DESTINATION | | 51,650 | 48,030 | 52,720 | 54,000 | 47,135 | 51,463 |
| % ABOVE LOWEST BID | | 10% | 2% | 12% | 15% | | 9% |
| TERMS AND CONDITIONS | | ACCEPTED | ACCEPTED | ACCEPTED | NOT ACCEPTED | ACCEPTED | ACCEPTED |
| PROGRESS PAYMENTS (IS YES CLICK TO VIEW) | | NO | NO | NO | YES | NO | NO |
| TERMS OF PAYMENT | | NET 30 | NET 30 | NET 30 | NET 45 | NET 20 | NET 20 |
| ESCALATION | | FIXED | FIXED | FIXED | FIXED | FIXED | FIXED |
| APPROVAL DRAWINGS (IN WEEKS ARO) | | 2 WEEKS | 3 WEEKS | 3 WEEKS | 2 WEEKS | 1.7 WEEKS | 1.7 WEEKS |

| APPROVALS (AUTO GENERATED FROM WORK FLOW) | ENGINEER | PROJECT MANAGER | BUYER | PROCUREMENT MGR | PROJECT MANAGER | CLIENT |
|---|---|---|---|---|---|---|
| APPROVER NAME | DANIEL LIEN | BEN EAZZETTA | JOHN EICHSTAED | ROBERT MULLENGER | SHAWN WENTZ | DICK BROWN |
| DATE APPROVED IN SYSTEM | 1-FEB-01 | 5-FEB-01 | 5-FEB-01 | 10-FEB-01 | 31-JAN-01 | 16-FEB-01 |
| ITEM 1) 6" GATE VALVE, ANSI 600 | | | | | | |
| SUPPLIER | A&B STAINLESS | MCJUNKIN | MCJUNKIN | WILSON | VAN LUWEEN | VAN LUWEEN BID 2 |
| | DESCRIPTION | DESCRIPTION | DESCRIPTION | DESCRIPTION | DESCRIPTION | DESCRIPTION |
| SELECT ITEM FOR CUSTOMIZATION | ☐ | ☐ | ☐ | ☐ | ☐ | ☐ |
| QUANTITY | 6 | 6 | 6 | 6 | 6 | 6 |
| PRICE | 1,000 | 1,100 | 1,200 | 1,250 | 1,020 | 1,276 |
| EXTENDED PRICE | 6,000 | 6,600 | 7,200 | 7,500 | 6,120 | 7,676 |
| PROMISED SHIP DATE (DATE OR WEEKS) | 20-MAR-01 | 20-MAR-01 | 15-MAR-01 | 20-FEB-01 | 20-FEB-01 | 24-FEB-01 |
| LINE ITEM NOTES (IF YES CLICK TO VIEW) | YES | NO | YES | NO | NO | YES |
| | ALTERNATE ~311 A&B STAINLESS | | | | | |
| ITEM 2) 3" GATE VALVE, ANSI 600 | | | | | | |
| SUPPLIER | A&B STAINLESS | MCJUNKIN NO BID | MCJUNKIN | WILSON | VAN LUWEEN | VAN LUWEEN BID 2 |
| | DESCRIPTION | | DESCRIPTION | DESCRIPTION | DESCRIPTION | DESCRIPTION |
| SELECT ITEM FOR CUSTOMIZATION | ☐ | | ☐ | ☐ | ☐ | ☐ |
| QUANTITY | 6 | | 6 | 6 | 6 | 6 |
| PRICE | 400 | | 500 | 475 | 375 | 427 |
| | 2,400 | | 3,000 | 2,850 | 2,250 | 2,562 |
| PROMISED SHIP DATE (DATE OR WEEKS) | 20-MAR-01 | | 15-MAR-01 | 20-FEB-01 | 20-FEB-01 | 24-FEB-01 |
| LINE ITEM NOTES (IF YES CLICK TO VIEW) | YES | | NO | NO | NO | YES |
| | ALTERNATE A&B STAINLESS | | | ALTERNATE WILSON | | |
| SELECT ITEM FOR CUSTOMIZATION | ☐ | | | ☐ | | |

| FILE | EDIT | VIEW | FAVORITES | TOOLS | HELP | ← → ⊗ ⟳ ⌂ | GO | LINK » |

| CURRENCY SELECTION USD | TRANSFER TYPE: DELIVERY DUTY PAID | SHIP TO THE ATTENTION OF: TEST FOUR |
| | | DELIVERY POINT: NA |

ADD OR MODIFY BY GOING TO RFQ    NOTES TO SUPPLIER

REVISION NOTE FIELD
ITEM 1 CANCELLED
ITEM 2 MODIFIED
ITEM 3 MODIFIED

INDUSTRIA PRODUCTS
SUPPLIER ONE

| ITEM | ACTIONS | SUPPLIER | PRODUCT NAME | CAT # | AMOUNT | CURRENCY | PRICE | QTY |
|---|---|---|---|---|---|---|---|---|
| 1 | CANCEL | ~~SUPPLIER ONE~~ | ~~TEST2~~ | ~~TEST#2~~ | ~~EA~~ | ~~USD~~ | ~~0.00~~ | |
| | | ~~CHARGE CODE:~~ | ~~TEST 666~~ | ~~VENDER CODE:~~ | ~~TEST 777~~ | ~~WORK CODE:~~ | ~~TEST 000~~ | |

NOTES TO SUPPLIER: NONE
SHIPPING ADDRESS SPECIAL INSTRUCTIONS: NONE
REQUIRED DELIVERY DATE: SEP 27, 2000  SHIPPING ADDRESS: 100 SHIPPING ST, MOUNTAIN VIEW, CA 94043, US
CARRIER: UPS  PSM CRITICAL: NO  CRITICAL SERVICE: NO

| ITEM | SUPPLIER | PRODUCT NAME | CAT # | AMOUNT | CURRENCY | PRICE | QTY |
|---|---|---|---|---|---|---|---|
| 2 | SUPPLIER ONE | TEST2 | TEST#3 | EA | USD | 8.00 | 1 |
| | CHARGE CODE: | TEST 789 | VENDER CODE: | TEST 890 | WORK CODE: | TEST 789 | |

NOTES TO SUPPLIER: NONE
SHIPPING ADDRESS SPECIAL INSTRUCTIONS: NONE
REQUIRED DELIVERY DATE: SEP 27, 2000  SHIPPING ADDRESS: 100 SHIPPING ST, MOUNTAIN VIEW, CA 94043, US
CARRIER: UPS  PSM CRITICAL: NO  CRITICAL SERVICE: NO

| ITEM | SUPPLIER | PRODUCT NAME | CAT # | AMOUNT | CURRENCY | PRICE | QTY |
|---|---|---|---|---|---|---|---|
| 3 | SUPPLIER ONE | TEST4 | TEST#4 | EA | USD | 33.00 | 2 |
| | CHARGE CODE: | TEST 999 | VENDER CODE: | TEST 786 | WORK CODE: | TEST 456 | |

NOTES TO SUPPLIER: NONE
SHIPPING ADDRESS SPECIAL INSTRUCTIONS: NONE
REQUIRED DELIVERY DATE: SEP 27, 2000  SHIPPING ADDRESS: 100 SHIPPING ST, MOUNTAIN VIEW, CA 94043, US
CARRIER: UPS  PSM CRITICAL: NO  CRITICAL SERVICE: NO

| ITEM | SUPPLIER | PRODUCT NAME | CAT # | AMOUNT | CURRENCY | PRICE | QTY |
|---|---|---|---|---|---|---|---|
| 4 | SUPPLIER ONE | TEST5 | TEST#5 | EA | USD | 22.00 | 1 |
| | CHARGE CODE: | TEST 999 | VENDER CODE: | TEST 786 | WORK CODE: | TEST 456 | |

NOTES TO SUPPLIER: NONE
SHIPPING ADDRESS SPECIAL INSTRUCTIONS: NONE

FIG.21

INDUSTRIA

| HOME | RFQ | IP VAULT | CURRENT REQUISITION | ORDER STATUS | FAVORITES | LOG OFF |

ORDER STATUS

FROM HERE YOU CAN CREATE A NEW REQUISITION, VIEW AN UNSUBMITTED REQUISITION, REVIEW THE STATUS OF AN EXISTING ORDER, OR DUPLICATE PREVIOUS ORDERS.
CREATE A NEW REQUISITION...
(REMEMBER, A REQUISITION IS AUTOMATICALLY CREATED WHEN YOU SELECT A PRODUCT FROM PRODUCT SEARCH. ONLY CREATE A REQUISITION HERE IF YOU ARE WORKING WITH MULTIPLE REQUISITIONS.)

QUICK JUMP TO ANOTHER REQUISITION STATUS - REQUISITIONS TO APPROVE UNSUBMITTED REQUISITIONS REQUISITIONS REQUIRING APPROVAL PARTIALLY SHIPPED ORDERS SHIPPING ORDERS DENIED REQUISITIONS EXECUTED ORDERS

ORDERS BEING PROCESSED
THESE ORDERS HAVE BEEN RECEIVED BY THE SUPPLIER AND WILL BE SHIPPED AS SOON AS POSSIBLE.

| 251 | ORDER | REV —252 | ORDER TITLE —254 | DATE SUBMITTED | SUBTOTAL | 256 SELECT ACTION | | EXP.NOTES |
|---|---|---|---|---|---|---|---|---|
| ☐ | 10529898 | 0 | REQUISITION 10529898 | 09/20/2000 | 6.90 | CHANGE ▽ | APPLY | N |
| ☐ | 10529897 | 1 | REQUISITION 10529897 | 10/18/2000 | 525.49 | CHANGE ▽ | APPLY | N |
| ☐ | 10529368 | 2 | REQUISITION 10529368 | 09/20/2000 | 3.00 | CHANGE ▽ | APPLY | Y |
| ☐ | 10528747 | 3 | REQUISITION 10528747 | 09/19/2000 | 3.00 | CHANGE ▽ | APPLY | N |
| ☐ | 10528342 | 4 | REQUISITION 10528342 | 09/19/2000 | 276.00 | CHANGE ▽ | APPLY | Y |
| ☐ | 10527472 | 5 | REQUISITION 10527472 | 09/18/2000 | 649.49 | CHANGE ▽ | APPLY | N |
| ☐ | 10527458 | 0 | REQUISITION 10527458 | 09/16/2000 | 3.00 | CHANGE ▽ | APPLY | N |
| ☐ | 10527449 | 1 | MULTIPLE SUPPLIERS - MULTIPLE ITEMS | 09/16/2000 | 649.49 | CHANGE ▽ | APPLY | Y |

| CHANGE ▽ | APPLY | TO APPLY AN ACTION TO MULTIPLE REQUISITIONS CHECK THE BOXES ON THE LEFT, SELECT AN ACTION FROM MENU AND CLICK APPLY.

[TOP]

FIG. 22

SYSTEMS AND METHODS FOR PROVIDING COMPONENT INFORMATION IN COLLABORATIVE DESIGN, CONSTRUCTION, AND MAINTENANCE OF FLUID PROCESSING PLANTS

PRIORITY

The present application is a divisional of, and therefore claims priority from, U.S. patent application Ser. No. 09/843,344 filed Apr. 25, 2001, which claims the benefit of U.S. Provisional Patent Application Nos. 60/211,285, 60/211,254, 60/228,016, and 60/264,792, filed Jun. 13, 2000, Jun. 13, 2000, Aug. 24, 2000, and Jan. 29, 2001, respectively. All of these patent applications are hereby incorporated herein by reference in their entireties.

BACKGROUND OF THE INVENTION

This invention relates to systems and methods for streamlining collaborative processes, and more particularly, this invention relates to a collaborative commerce application that may be used for collaboratively designing, constructing, and maintaining fluid processing plants.

Engineering of, material procurement for, and construction of fluid processing plants has a long, complex design-build cycle. Furthermore, once construction is complete, material procurement for plant maintenance, such as replacing a worn-out heat exchanger bundle or upgrading a processing vessel, is often a cumbersome, error-prone process.

Almost all facets of fluid processing plants, ranging from designing a fluid processing plant, to constructing a fluid processing plant, to maintaining a fluid processing plant involve a complex mesh of procedures, specialists, and materials. The complexity of engineering information associated with fluid processing plants makes clear, accurate communication difficult. Because large numbers of people from different organizations are involved (e.g., the owner company customer, the engineering, procurement and construction (EPC) contractor, and the many vendors, fabricators and manufacturers), and because many of them manipulate the data during the design, build, or fabrication phases, errors are very likely.

The pressure to deliver on schedule, and to eliminate as many errors as possible, makes the bidding process slow and tentative. The engineering media used, such as data sheets, specifications, and two-dimensional computer aided design (CAD) drawings, are fundamentally clumsy and hard to distribute to remote locations. They must be reproduced and mailed—a process that consumes valuable time.

Version control presents another source of inefficiency. For example, much confusion typically arises when multiple engineering groups, for example, at remote locations attempt to coordinate reviewing and editing a set of drawings. Often times, there is an inconsistency with regard to the versions being worked on by the different engineering groups.

During the engineering of, material procurement for, and construction of a fluid processing plant, a tremendous amount of equipment information is developed. However, this information is often too difficult to access to be of much benefit to the engineers and mechanics who later operate and maintain the plant.

Two trends in the industry have exacerbated these problems. One of these trends is globalization. For example, it is not unusual to do engineering in India and vessel fabrication in Korea for a fluid processing plant in France that is being built or upgraded for a customer in Houston. The long distances between sites add to communication difficulty.

The second trend is an increasing use of three-dimensional CAD models. These models allow engineers to build a plant electronically before building it in the field in order to see connection points, test clearances, and check for human ergonomic factors early in the design process. As a result, the models help eliminate unwanted changes later in the detailed engineering and construction process. Yet mistakes still happen, and they often do not become obvious until late in the cycle, when the cost of fixing them undercuts any efficiencies gained earlier in the process.

In addition, three-dimensional CAD modeling systems do little to make design review and procurement easier. It takes an expensive, sophisticated workstation to view a plant model. The models are so large that e-mailing them from place to place is prohibitively time-consuming, even with high-speed Intranet or Internet access. If the model is shipped on a large capacity disk or if file transfer protocol (FTP) is used, the recipient can view it only with a tool that uses the same proprietary software platform on which the three-dimensional model was created. Often, if the recipient does not have access to the proprietary platform, the recipient is required to make the investment necessary to obtain the platform.

Security is a source of problems with regard to complicated design models that go through several stages of revision. Once the entity that has developed the model releases it, parties that do not necessarily require access have access to the entire body of data.

It is therefore an object of the present invention to provide a way in which the design, construction, and maintenance of fluid processing plants may be made more efficient by removing major sources of error and allowing for easier collaboration.

SUMMARY OF THE INVENTION

This and other objects of the present invention are accomplished by providing a collaborative commerce application for the design, construction, and maintenance of fluid processing plants.

The collaborative commerce application may be used to provide a collaborative environment in which project team members for a particular project are able to communicate with each other using the latest information available. For example, version control may be made more efficient by providing users of the collaborative commerce application with notifications of any changes that may occur to designs, schedules, or any other suitable facets of a project. Task management utilities may also be provided to streamline the design, construction, and maintenance processes.

Visualization features may be offered by the collaborative commerce application. For example, two or more remote project team members may discuss a design by each having a schematic of the design on their respective displays. The design may be editable by the project team members such that when changes are made, the other project team members may simultaneously see the changes on their displays. For those project team members that are configured to receive design changes, and who were not present at the discussion, notifications provided by the collaborative commerce application may provide information about any changes made.

The collaborative commerce application may provide users (e.g., project team members, suppliers, manufacturers, or any other suitable users) with the ability to view graphical models of components used in fluid processing plants. The components may be components that are used in the construction of the fluid processing plants, in the maintenance of fluid processing plants, or both. Any suitable portion of the graphical model may be selected by the users. For example, sub-components may be selected. In response, the collaborative commerce application may display information associated with the selected portion, such as a more detailed schematic of the portion. In another suitable approach, the collaborative commerce application may provide bills of materials for sub-components that are selected by users.

Material procurement may be accomplished using the collaborative commerce application of the present invention. In one suitable approach, a requisition/approver/buyer cycle may be used, whereby a requisition is made, an approver approves (or rejects) the requisition, and a buyer is responsible for acquiring the material requested. For example, this arrangement may be used in conjunction with a dynamic pricing feature. The dynamic pricing feature may provide users of the collaborative commerce application with the ability to perform requests for quotes, reverse auctions, or any other suitable dynamic pricing events.

Material procurement may also be provided via, for example, searches. The collaborative commerce application may provide users with the ability to perform searches based on, for example, metadata attributes of components. In one suitable approach, selecting a component from a graphical model may automatically allow for a search to be performed based on the metadata attributes of the component selected. Searches may also be based on category (e.g., piping, valves, etc.), on part numbers (e.g., manufacturer part numbers, site part numbers, supplier part numbers, etc.), on suppliers, on keywords, or on any other suitable criteria.

Change order processing may also be provided by the collaborative commerce application of the present invention. Notifications to suitable parties may be automatically generated when changes are made to orders, to dynamic pricing events, or to any other suitable aspect of material procurement.

The collaborative commerce application may provide certification information about manufacturers of materials used in fluid processing plants. The information may include information related to the fabrication history of a facility, code stamps, employee training records, customer satisfaction records, inspectors' notes, videos and images, quality assurance practices, and any other suitable information. In one suitable approach, a video walkthrough of a facility may be provided. Any other information may be requested by users of the collaborative commerce application.

BRIEF DESCRIPTION OF THE DRAWINGS

The above and other objects of the present invention will be apparent upon consideration of the following detailed description, taken in conjunction with the accompanying drawings, in which like reference characters refer to like parts throughout, and in which:

FIG. 6 shows an illustrative display screen in which a graphical model may be displayed with information related to the graphical model in accordance with one embodiment of the present invention;

FIG. 10 shows an illustrative display screen that provides search functionality in accordance with one embodiment of the present invention;

FIGS. 11A and 11B show illustrative display screens that provide category search functionality in accordance with one embodiment of the present invention;

FIG. 12B shows an illustrative display screen in which metadata may be used as search criteria in accordance with one embodiment of the present invention;

FIG. 14 shows an illustrative display screen that may be used to list search results in accordance with one embodiment of the present invention;

FIGS. 19A and 19B show illustrative display screens in which bid tabulation and bid analysis may be provided in accordance with one embodiment of the present invention;

FIGS. 20A and 20B show illustrative display screens in for modifying and cancelling orders in accordance with one embodiment of the present invention;

FIG. 21 shows an illustrative display screen in which the status of prior and pending orders may be accessed in accordance with one embodiment of the present invention;

FIG. 22 shows an illustrative display screen in which inspection and certification information may be accessed in accordance with one embodiment of the present invention;

DETAILED DESCRIPTION OF THE PREFERRED EMBODIMENTS

Figure 1A:
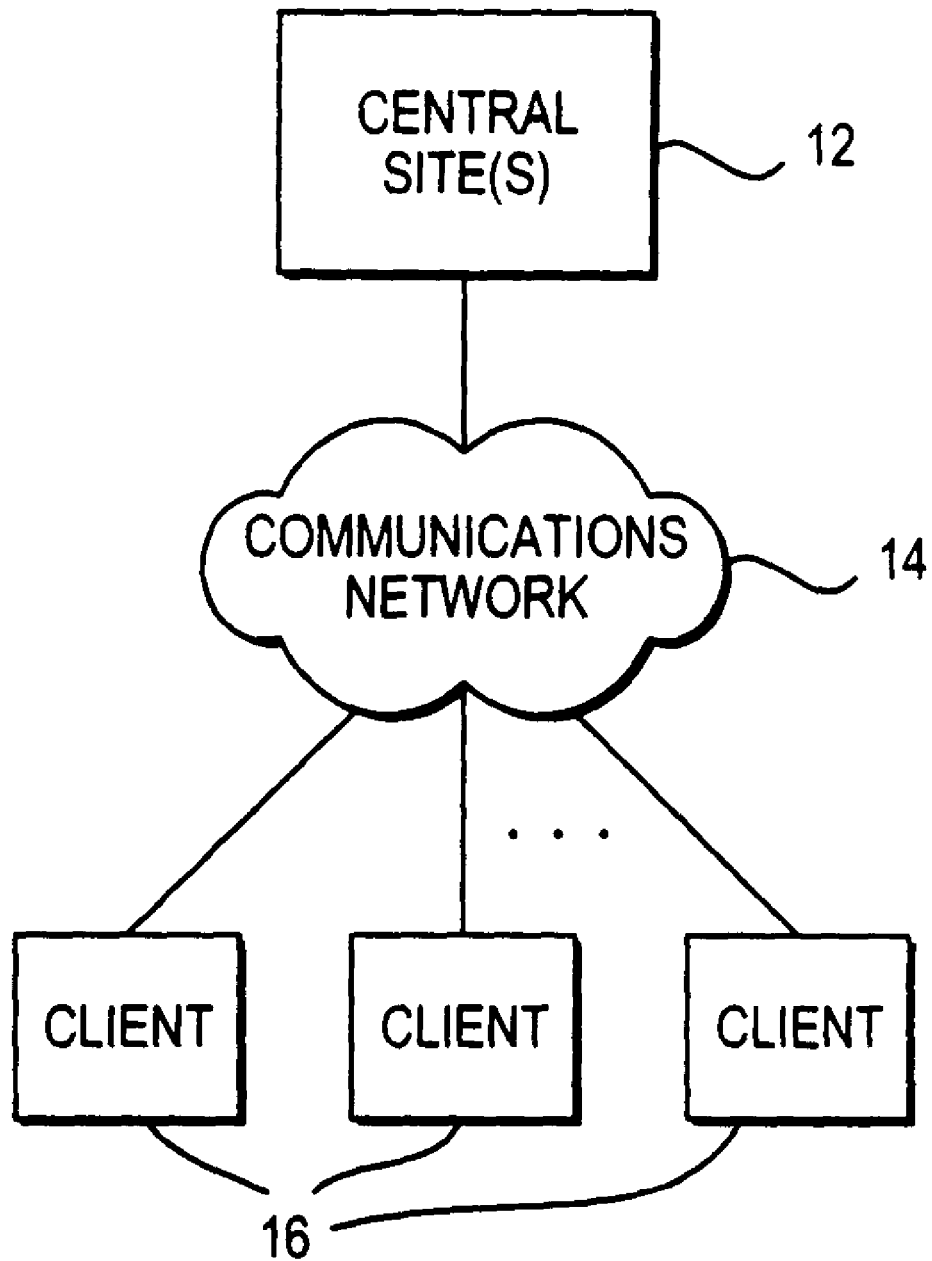
FIG. 1A is a schematic drawing of an illustrative collaborative fluid processing plant design, construction, and maintenance system in accordance with one embodiment of the present invention.
Figure 1B:
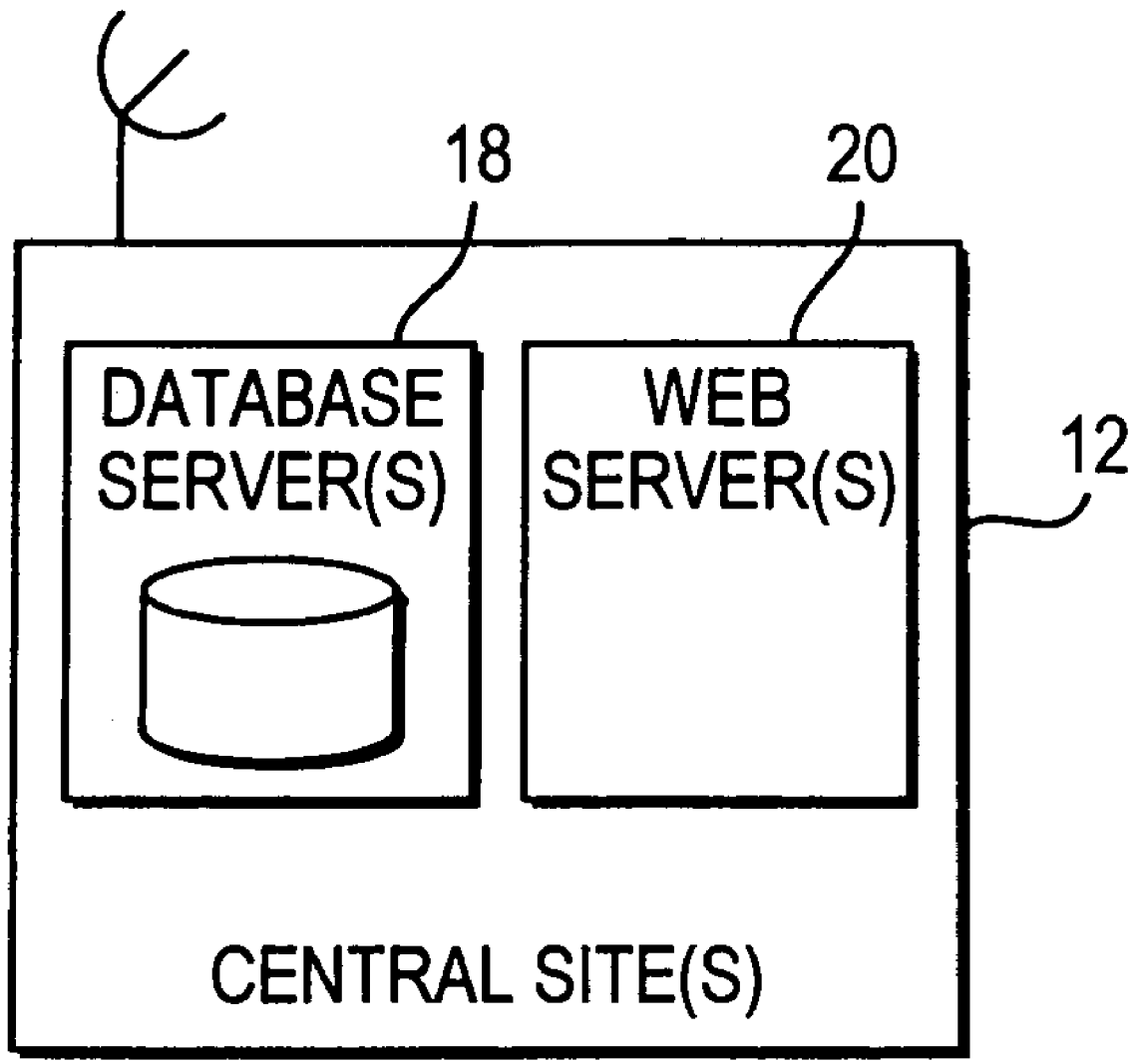
FIG. 1B is a schematic drawing of the illustrative central site of FIG. 1A in accordance with one embodiment of the present invention.

FIG. 1A shows an illustrative collaborative fluid processing plant design, construction, and maintenance system 10 in accordance with the present invention. System 10 may include a central site 12. Central site 12 may include any suitable hardware, software, or both. For example, as illustrated in FIG. 1B, central site 12 may include a web server 20, a database server 18, any suitable communications hardware (e.g., satellite receivers/transmitters, modems, or any other suitable communications hardware, software, or both), or any combination of these or any other suitable elements. Central site 12 may include one or more sites. For example, central site 12 may include equipment located at different geographical locations.

Each client 16 may be any suitable collection of hardware, software, data, personnel, or any other suitable elements. In one suitable embodiment, each client 16 need not have the same elements as any other client 16. Alternatively, each client 16 may be required to have a standard collection of predefined elements. For example, client 16 may be required to have, at a minimum, a personal computer and suitable communication hardware and software. This is merely an illustrative client representation. Any such suitable client 16 may be used.

Client 16 may communicate with central site 12 using communications network 14. Communications network 14 may be any suitable communications network such as, for example, a local area network (LAN), a wide area network (WAN), an Intranet, the Internet, a telephone network, any suitable wireless network, or any other suitable communications network. Suitable wireless networks may include time-division multiple access (TDMA) networks, code-division multiple access (CDMA) networks, or any other suitable wireless networks.

In one suitable approach, a particular client 16 may communicate with central site 12 using one suitable form of communications network 14 such as over the Internet, while another client 16 may communicate with central site 12 using another suitable communications network 14 such as a LAN. Any such suitable combination of networks may be used by different clients 16.

Clients 16 may directly communicate with each other using communications network 14. Alternatively, clients 16 may communicate with each other via both communications network 14 and central site 12. Any such suitable arrangement may be used to allow clients 16 to communicate with each other.

Client 16 and central site 12 may communicate over communications network 14 using any suitable protocol or protocol stack. For example, client 16 and central site 12 may communicate via a transmission control protocol/Internet protocol (TCP/IP) environment and a hypertext transfer protocol (HTTP). Any suitable request-response type of protocol and socket-based packet transport stack, or suitable peer-to-peer communications approach may be used as desired.

Each client 16 may represent any suitable user of the collaborative effort in the design, production, or maintenance of fluid processing plants. For example, client 16 may represent an engineering office from which design information or any other suitable information may be communicated to central site 12. Client 16 may represent a construction site at which a fluid processing plant is being constructed. Client 16 may represent a retailer of component parts that are used to maintain fluid processing plants. Client 16 may represent any such suitable user of the collaborative effort in the design, production, or maintenance of fluid processing plants and is not limited to the preceding illustrative examples.

For purposes of clarity and brevity, the present invention is primarily described herein using a client/server arrangement where communications network 14 is the Internet. Communication between client 16 and central site 12 is primarily described using markup language, such as, for example, hypertext markup language (HTML) or secure hypertext markup language (HTTPS). A client 16 is primarily described as a personal computer that accesses central site via communications network 16 using a world wide web browser. It should be understood that this is merely an illustrative embodiment and that the present invention is not limited to such an embodiment and may be modified in any suitable way.

Central site 12 is illustratively described as one or more servers on which a collaborative commerce application may be implemented. In an alternative approach, one or more servers at central site 12 may access a collaborative commerce application at another location via, for example, communications network 14. The collaborative commerce application may be any suitable software, hardware, or both that may be used to provide the features of the present invention as described herein. For example, the collaborative commerce application may include a web site, a database engine, an administrative interface, and any other suitable components.

Figure 2:
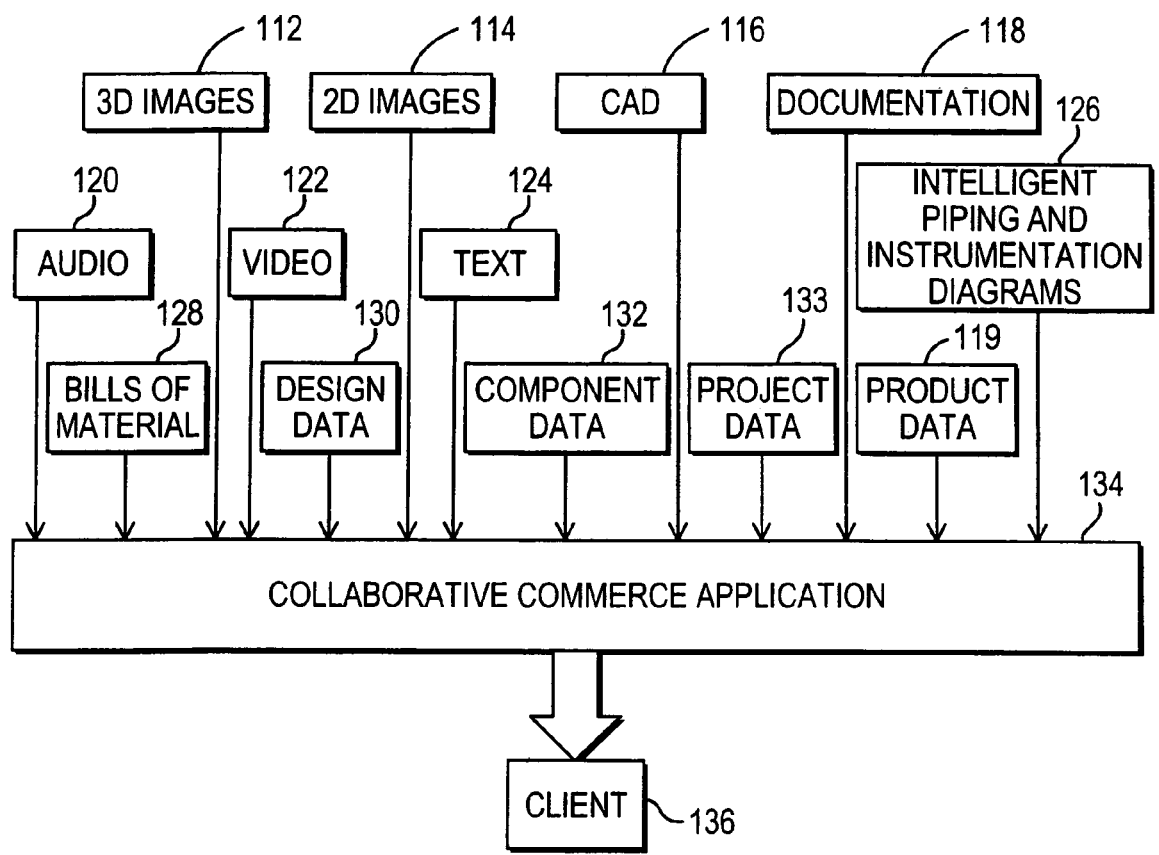
FIG. 2 is a block diagram of illustrative data that may be provided by the collaborative commerce application in accordance with one embodiment of the present invention.

The present invention may be used to provide clients with any suitable information with regard to the design, construction, and maintenance of fluid processing plants. FIG. 2 provides an illustrative high-level view of how the collaborative commerce application may be used to provide this functionality of information distribution.

For example, any suitable information, such as three-dimensional images 112, two-dimensional images 114, computer-aided design data 116, documentation 118, product data 119, audio data 120, video data 122, textual data 124, intelligent piping and instrumentation diagrams 126, bills of material 128, design data 130, component data 132, project data 133, and any other suitable information may be parsed, processed, or both by collaborative commerce application 134 for use by client 136. This model of information flow and distribution may be applied to any suitable embodiment of the present invention.

Figure 3:
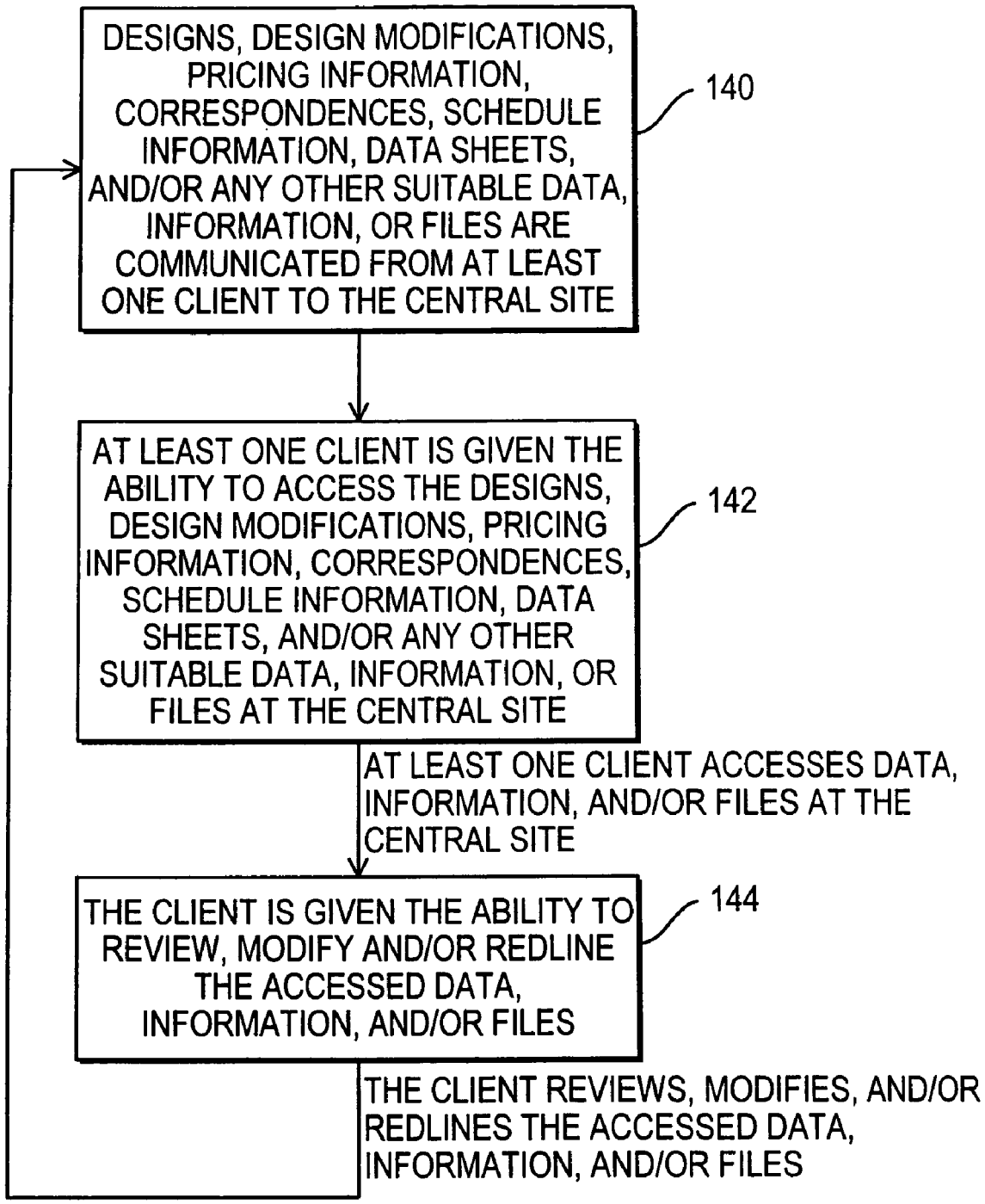
FIG. 3 is a flow chart of illustrative steps involved in the collaborative features of the collaborative commerce application in accordance with one embodiment of the present invention.

FIG. 3 is a flow chart that shows an overview of an illustrative process for communicating information between clients 16 and central site 12. For example, at step 140 any suitable data, information, or files such as component designs, design modifications, pricing information, correspondences (e.g., e-mail, instant messages, or any other suitable correspondences) schedule information, data sheets, or any other suitable data, information, or files may be communicated from a client 16 to central site 12, via for example, communications network 14. Web server 20 may be used for communicating with client 16. The content of the communication may be stored in database server 18.

At step 142, the collaborative commerce application of the present invention may provide a client 16 with the ability to access the content of, for example, database server 18 at central site 12. In one suitable approach, access to content may be limited based on, for example, the identity of the particular client 16 attempting to access the content.

When a client 16 accesses content from central site 12, the collaborative commerce application may allow client 16 to review, modify, and/or redline the accessed content, via, for example, a web-browser and communication network 14 (step 144). Any such suitable approach to the communication of content between clients 16 and central site 12 may be used.

Figure 4:
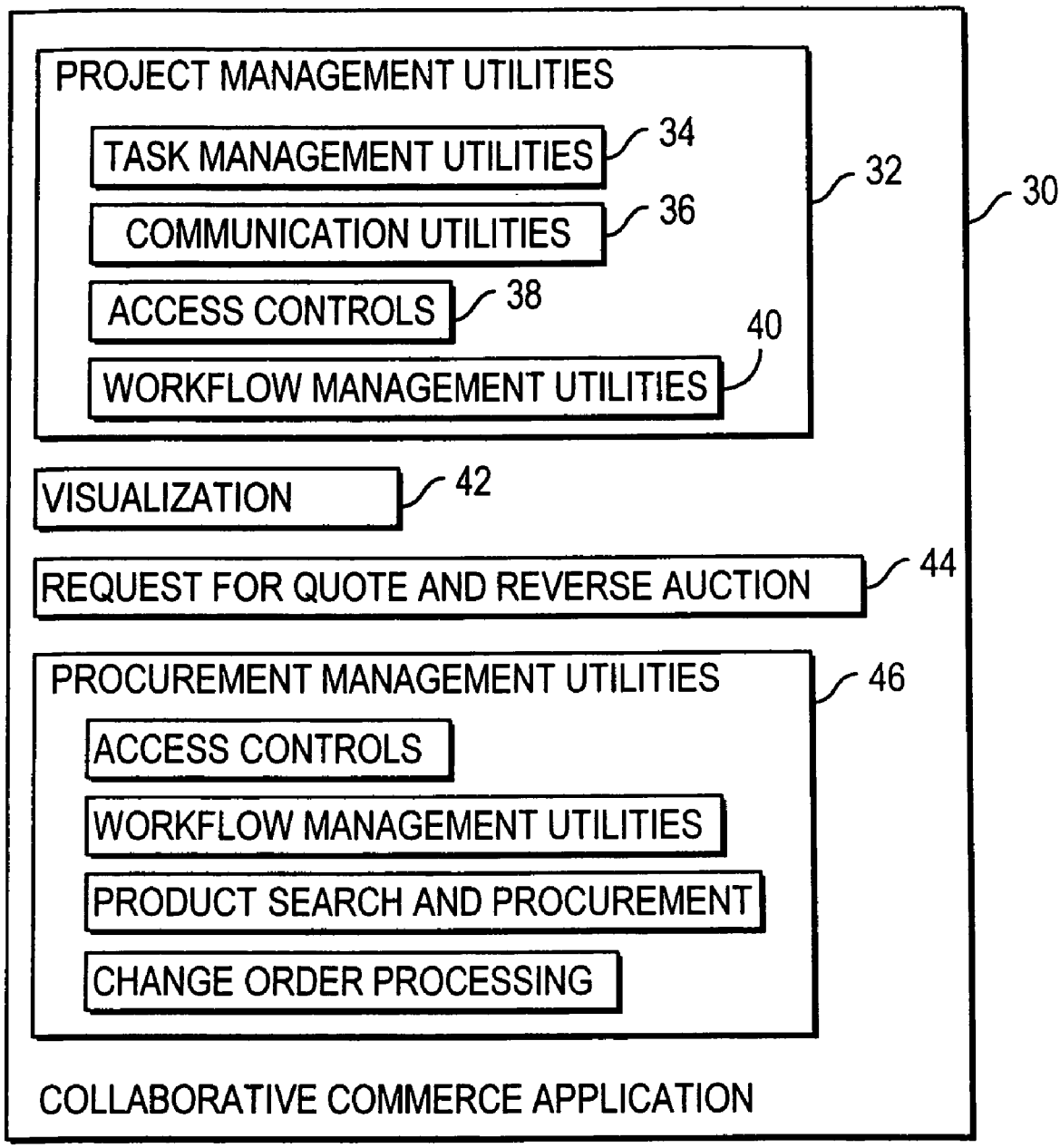
FIG. 4 is a block diagram of illustrative features that may be provided by the collaborative commerce application in accordance with one embodiment of the present invention.

In one suitable embodiment of the present invention, the collaborative commerce application 30 of FIG. 4 may enable multiple parties that are involved in the design, fabrication, or maintenance of fluid processing plants to cooperatively work together. The parties involved on a particular project are herein referred to as project team members. Project team members may include, for example, engineers, construction personnel, investors, management personnel, maintenance personnel, or any other suitable parties. One or more project team members may be represented as a client 16.

Suitable project management utilities 32 may be made available to the members of a particular project team. Project management utilities 32 may include task management utilities 34. Task management utilities 34 may include calenders that may show, for example, projected completion dates for particular facets of the project, deadlines for particular members of the team to complete assigned tasks, and any other suitable dates. Other task management utilities 34 may include a checklist of all tasks that need to be completed, a project bulletin board that may be used to post notices for project team members to read, a white board that may be used by project team members for free-form collaboration, a complete, time-stamped audit trail of all project activity, or any other suitable task management utilities. If desired, a shared directory may be made available to the project team members that may hold suitable information associated with the project team members such as, for example, contact information, employer, project access, or any other suitable information.

In one suitable approach, task management data may be exportable to suitable hardware, software, or both from central site 12. For example, a project team member may export calendar data into his or her personal digital assistant (PDA). If desired, any other suitable data from central site 12 may be exportable to suitable hardware, software, or both.

Project management utilities 32 may also include suitable communication utilities 36. Communication utilities 36 may include, for example, instant messaging capabilities between project team members, email notifications to project team members, discussion groups within the project team, or any other suitable communication utility. Email notifications may be automatically generated, for example, when changes are made to designs, or in response to any other suitable specified event. Alternatively, email notifications may be sent from a member of the project team to other members of the project team. Any such suitable use of email notification may be used. Discussion groups may be private to just the project team. Alternatively, discussion groups may be in the form of public Usenet groups. Any such suitable use of discussion groups may be used. These are merely illustrative communication utilities that may be used by the present invention. It should be understood that any other suitable communication utility may be used.

Collaborative commerce application 30 may also provide comprehensive access controls 38 and workflow management capabilities 40 to its users. Some of these illustrative functionalities may include, for example, providing to a system administrator the ability to input and manage overall domain access and permissions. Project-related permissions may be managed by one or more designated users, such as, for example, a project team leader. Domain workflow rules may be managed by a system administrator, while project-related workflow rules may be managed by one or more designated users, such as, for example, a project team leader.

Access groups may be used, whereby all members of a particular access group may be granted the same access privileges. If desired, the access groups of a particular project team may have a hierarchical structure with certain access groups having more privileges than other access groups. In another suitable approach, access groups may be used to designate particular project team members as having similar responsibilities. Any such suitable use of access groups may be implemented.

If desired, workflows and access controls from an existing project may be cloned to a new project. For example, if a particular arrangement of workflows and access controls proved to be efficient in a particular project, the same configuration may be used in a subsequent project.

Workflow management may be facilitated through the use of a graphical user interface for workflow configuration. Any suitable interface may be used. Other workflow management utilities 50 may include the ability to embed workflows within workflows (e.g., parallel or series workflows), the ability to provide branched workflows based on triggering events. Any suitable workflow management utilities may be used.

Project management utilities 32 of collaborative commerce application 30 may allow specified project team members to electronically approve designs, materials, schedules, requisitions, or any other suitable elements of the design, fabrication, and maintenance of fluid processing plants. In order to facilitate the approval process, approval groups may be used that identify respective approvers. Each approval group may have one or more project team members associated with it. Approval requesters may select an appropriate approver from a list of approval groups. The approver may then be notified that his or her approval is requested. The approver or approvers may be notified via any suitable notification method, such as via email, instant messaging, paging, or any other suitable notification method. In another approach, the approver may be notified manually, such as, for example, by the requester orally communicating the notification, via, for example, a telephone. The approver may be provided with any suitable information, such as, for example, the identity of the original requester, the request creation date, the request submission date, or any other suitable information.

Approvers that are delaying workflow may be reminded of pending requests via, for example, email, instant messaging, paging, or any other suitable communication method. These reminders may be sent automatically by collaborative commerce application 30 based on the deadline dates specified in, for example, the workflow, the approval request, or any other suitable source of deadline information.

Once approvers examine the element which needs approval, the approvers may either approve the element or reject the element. In either case, the approver may be given the ability to annotate his or decision with one or more notes (e.g., in electronic form). In one suitable approach, anytime an element is rejected, the approver may be required to specify why it was rejected. Notes may be viewed by any suitable project team members.

In one suitable approach, collaborative commerce application 30 may allow delegates to be designated for approval roles. For example, if a project team member will not be available for a period of time, another project team member may take on the approval role of the unavailable person. Any suitable delegation feature may be used in instances of project team member unavailability.

Collaborative commerce application 30 may provide a visualization feature 42. Visualization feature 42 may provide collaborative commerce application 30 with capabilities for two-dimensional and three-dimensional visualization and collaboration tools. These tools may allow users to view, analyze, and annotate schematics and any other suitable forms of data over, for example, communications network 14. Schematics may be in the form of two-dimensional images, three-dimensional images, 360.degree. images, 180.degree. images, or any other suitable forms of images.

Figure 5:
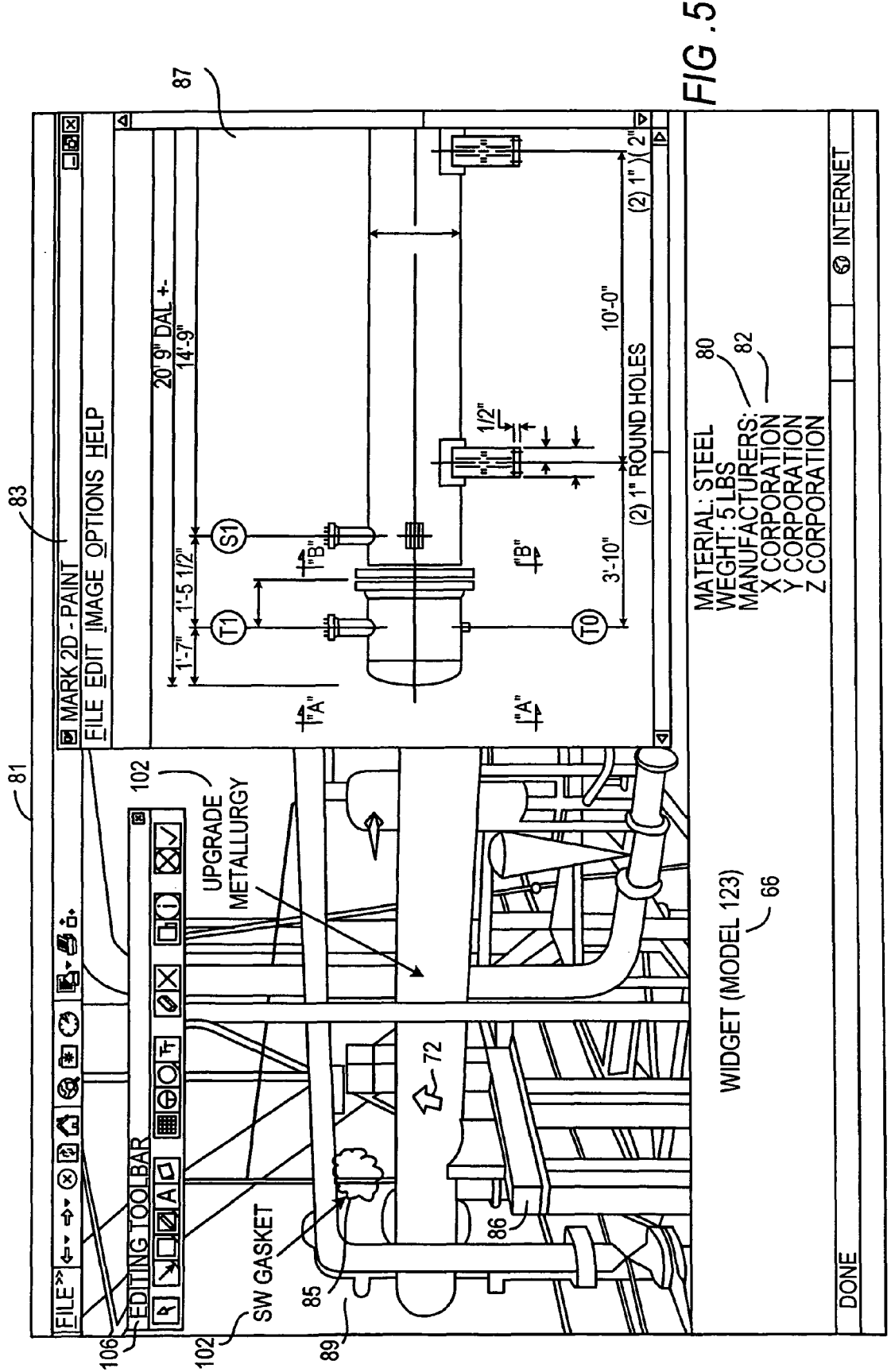
FIG. 5 shows an illustrative display screen in which a graphical model may be displayed by the collaborative commerce application in accordance with one embodiment of the present invention.

For example, FIG. 5 illustrates collaborative commerce application display screen 81 that may be viewable by any suitable user, via communications network 14, at, for example, client 16. Image 89 may be displayed on display screen 81. Image 89 may be any suitable image. For example, image 89 may be an image of one or more parts that are to be used in the construction of a fluid processing plant. Image 89 may be in the form of a two-dimensional image, three-dimensional image, 360.degree. image, 180.degree. image, or any other suitable type of image. Image 89 may correspond to one or more data files that may be stored at central site 12 (in, for example, database server 18). For example, image 89 may correspond to any suitable computer-aided design file format (e.g., DWG, DXF, DWF, SLDDRW, DGN, Me10, MI, CMI, PRT, or any other suitable computer-aided design file format). Image 89 may correspond to any suitable standards file format (e.g., CGM, CAL, CALS G4, MIL, ISO 9000 compliant banners and watermarks, or any other suitable standards file format). Image 89 may correspond to common image formats (e.g., TIFF, JPEG, PCX, GIF, BMP, 000, CIT, DG, DX, DIF, EDC, EDM, FTK, G3, G4, GP4, IGS, MOT, RLC, RLE, RNL, or any other suitable common image formats). Image 89 may correspond to file formats for three-dimensional imagery (e.g., DWG, MDB, DGN, PDMS, EXP, DRI, DRV, PRP, PRT, ASM, PAR, PSM, STL, WRL, or any other suitable three-dimensional image format). These are merely illustrative image formats that may be supported by the collaborative commerce application of the present invention. Any other suitable formats may be supported in addition to these formats or in place of any of these formats.

Image 89 may be printed by the collaborative commerce application using any suitable plot file format (e.g., HPGL/2, 906, 907, or any other suitable plot file format).

As illustrated, image 89 of display screen 81 is a three-dimensional image of a particular device that may be related to fluid processing plant construction or maintenance. Title and model information 66 may also be provided. The device represented by image 89 may be created from one or more parts, such as parts 85 and 86. In one suitable embodiment of the present invention, users may select any parts of a device using, for example, cursor 72. In response to a user selection of a part, the collaborative commerce application may provide further information on the selected part.

For example, two dimensional image 87, that may, for example, show various views of the selected part (e.g., part 85) may be displayed in display screen 81. Data, such as data 80 may be provided using display screen 81. Data 80 may include any suitable information about the selected part (e.g., part 85). For example, data 80 may include information related to manufacturers of the selected part, any suitable specifications of the selected part, cost of the selected part, or any other suitable data. It should be understood that display screen 81, as shown, is merely an illustrative display screen. Any other suitable information may be provided in addition to, or in place of, the information shown in display screen 81.

In one suitable approach, any suitable images, data, or both that is provided via, for example, a display screen such as display screen 81 may provide links (e.g., hyperlinks) to additional information related to the corresponding image or data. For example, in display screen 81, users may obtain additional information about x corporation by selecting link 82, using, for example, cursor 72, or by using any other suitable selection technique.

Figure 6:
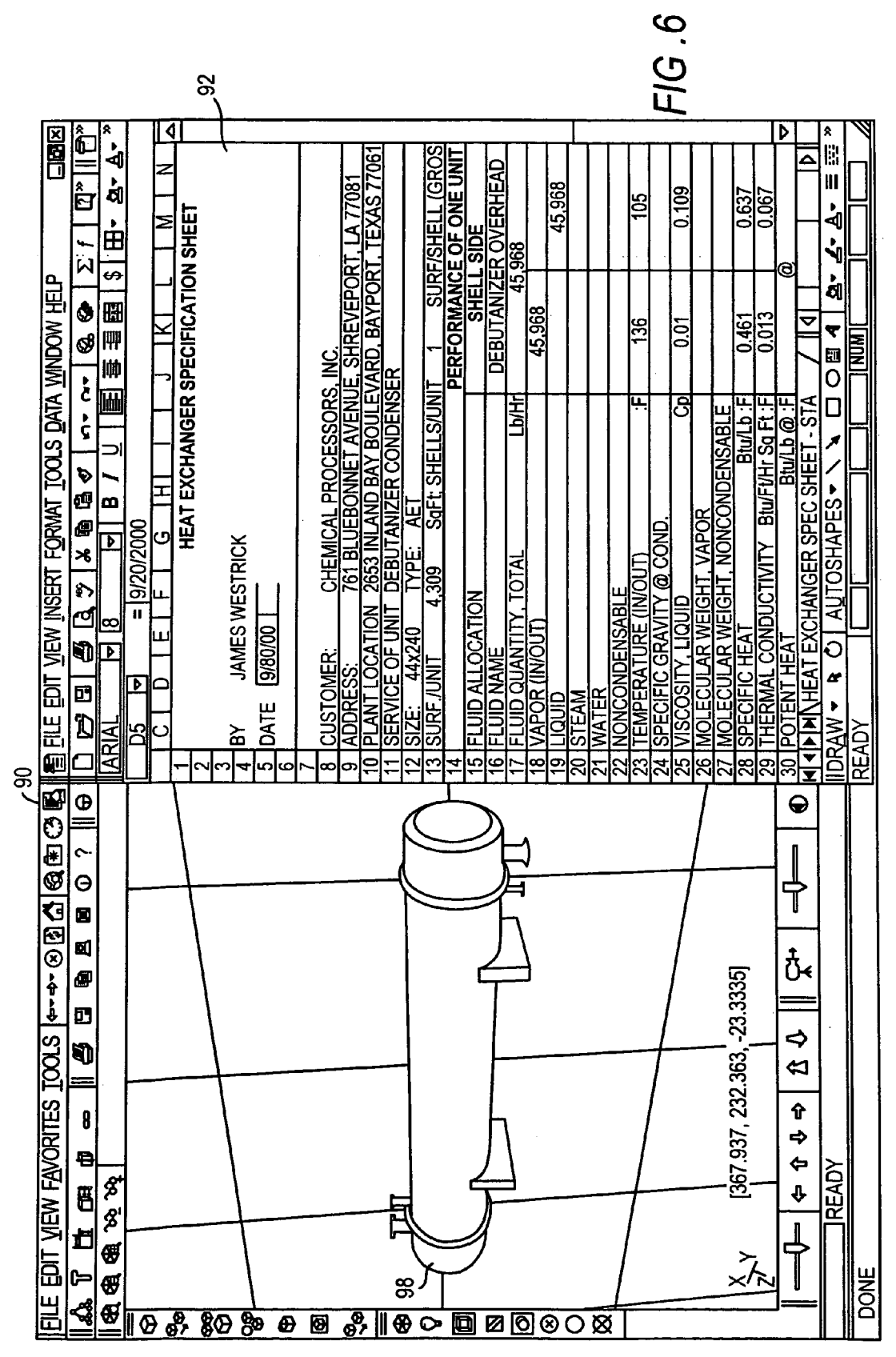

In one suitable embodiment of the present invention, the collaborative commerce application may enable users to select any device, part, or any other suitable object, from, for example, a schematic, a data sheet, or from any other suitable source. Upon selection, the collaborative commerce application may provide additional information related to the selected object via. FIG. 6 shows an illustrative display screen 90 that may be displayed in response to a request for additional information related to a particular object. Additional information may be provided in any suitable form. For example, additional information may be a specification or data sheet, a bill of materials, contact information, any other suitable information, or any suitable combination thereof.

Specification sheet 92 may include any suitable information related to a particular component. Image 98 may be displayed with specification sheet 92 in display screen 90. Image 98 may be any suitable image of the component for which the specification sheet provides information. For example, image 98 may be a two-dimensional image, a three-dimensional image, or any other suitable type of image.

Display screen 90 is merely illustrative. Any other suitable arrangement may be used. In another suitable approach, selection of a component result in the collaborative commerce application providing information in place of or in addition to the content illustrated in FIG. 6. For example, a bill or material may be provided that may be used to list the subassembly components of a selected component.

Visualization tools may also be used with regard to the collaboration features of the collaborative commerce application of the present invention. For example, users may access image data or create image data, via, for example, communications network 14. Users may then annotate, edit, or create images related to particular projects with which the users are associated. For example, as shown in FIG. 5 the collaborative commerce application may provide editing tools 106. Editing tools 106 may include any suitable editing tools. For example, editing tools 106 may include tools for creating various shapes, for choosing colors, for using imaging effects, for inserting text, for changing views, or for performing any other suitable editing functions. In one suitable approach, editing tools may be as robust as desired, even mimicking application suites such as AutoCAD or any other suitable applications that provide graphics editing tools. In terms of hardware, any suitable devices may be used to input any edits. For example, traditional mice, digital pens, tablets, optical mice, or any other suitable device may be used to input edits.

In one suitable approach, particular users (i.e., project team members) may be given editing capabilities that may depend, for example, on a user's access level or on any other suitable classification.

FIG. 5 shows a user using editing tools 106 to add notations 102 to image 89. The user may be involved in the design of this particular object and may have the access that would allow him or her to make such edits. Edits may include edits to the actual design. Edits may also include redlining. Redlining, as used herein, includes annotating, marking-up, or otherwise showing what changes are to be made or showing what changes were made. Redlining may be used for graphical objects (e.g., image 89) or for textual data (e.g., specifications, requisitions, or any other suitable textual data).

In one suitable approach, display screen 81 may be a display screen that may be used in a teleconference. For example, in a design meeting with designers and engineers, where some members of the project team are in different locations, the collaborative commerce application may be used to allow the members to visualize, in real-time, changes that are being proposed. More particularly, by using existing designs and data that are being stored at central site 12, clients may access the latest versions of the designs and may change them (e.g., temporarily for the purpose of the meeting, or permanently if, for example, the members agree to the changes). As one client changes the latest version, all other clients may view the changes being made, via, for example, display screen 81.

Figure 7:
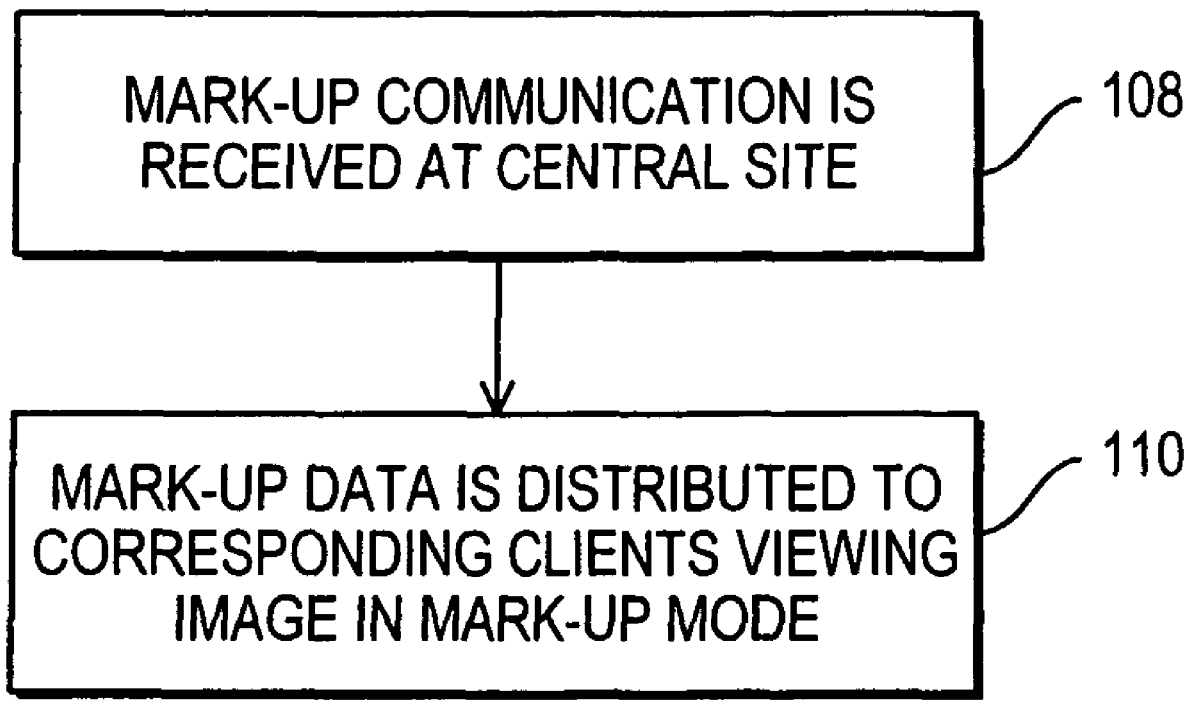
FIG. 7 is a flow chart of illustrative steps involved in using a mark-up feature in accordance with one embodiment of the present invention.

FIG. 7 is a flow chart that illustrates the above-mentioned process. At step 108, the changes that were made by one of the clients is received at central site 12. At step 110, these changes may be sent to all other clients that are taking part in the teleconference. Changes may be uploaded from each client to the central site on periodic intervals. Alternatively, the collaborative commerce application may communicate changes from clients to central site 12 by determining if a change has been made to the data on the client side. Once data is received at central site 12, the data may be relayed to all clients 16 that are participating in the teleconference. These are merely illustrative ways in which edit data may communicated among clients 16 via system 10. Any other suitable method may be used.

In another suitable embodiment of the present invention, the collaborative commerce application may provide functionality for product and material procurement (as illustrated by box 46 of FIG. 4). In such an embodiment, in addition to designers, engineers, executives, strategists, and any other suitable entity associated with the design, construction, and maintenance of fluid processing plants, clients 16 may also include component source entities such as component suppliers, component manufacturers, component distributers, component resellers, component retailers, and any other suitable component source entities.

Component source entities may provide central site 12 with information, including, data sheets, pricing information, availability information, and any other suitable information regarding components that may be used in the design, construction, and maintenance of fluid processing plants. The collaborative commerce application may, in turn, allow project team members to access the information provided by the component source entities.

Figure 8A:
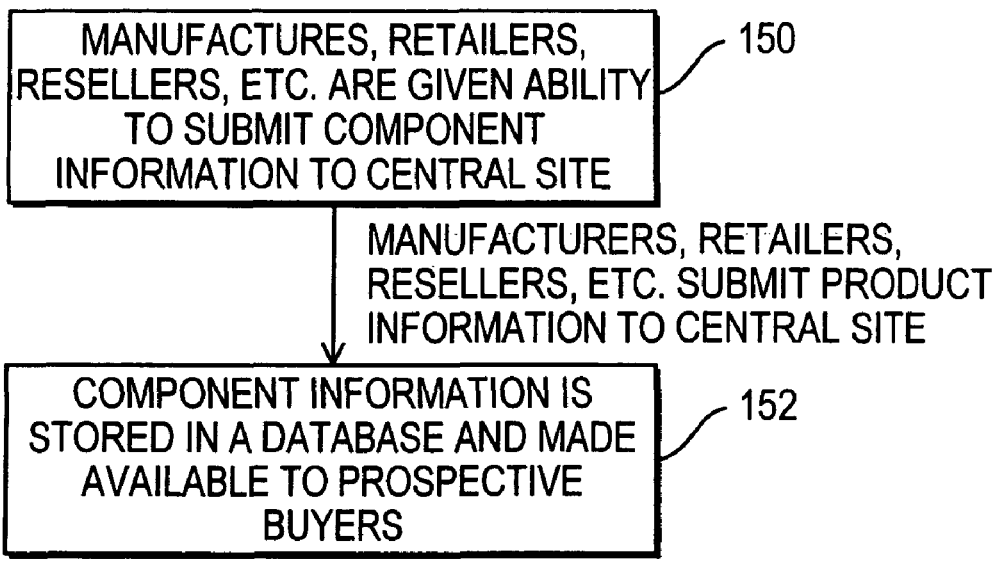
FIGS. 8A and 8B are flow charts of illustrative steps involved in cataloging and providing users with access to component information in accordance with one embodiment of the present invention.

FIG. 8A is a flow chart of an illustrative process that may be used to allow component source entities to provide central site 12 with component information. At step 150, the collaborative commerce application may give the component source entities the ability to submit component information to central site 12, via, for example, communication network 14. When the component is submitted, then at step 152 the component information may be stored in a database, such as database 18, and made available to prospective buyers, via, for example, communications network 14 and the collaborative commerce application.

Figure 8B:
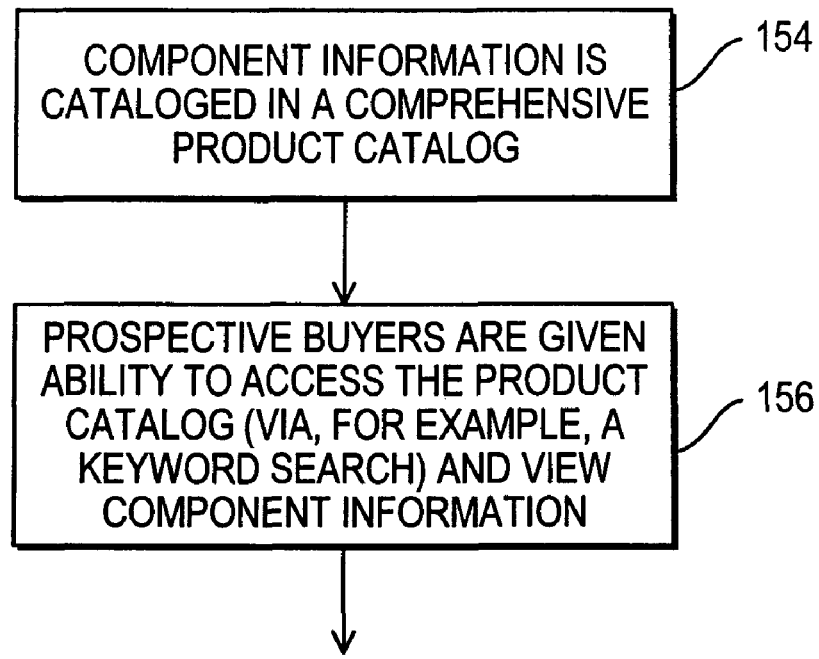

FIG. 8B is an illustrative process that may be used to allow project team members that may be prospective buyers of components to access component information (and purchase suitable components). At step 154, the component information that was stored in a database, such as database 18, may be cataloged in a comprehensive product catalog by, for example, the collaborative commerce application. This may be done using, for example, any suitable database arrangement, such as a relational database with appropriate key indices. Any other suitable approach for cataloging components may be used. At step 156, prospective buyers may be given the ability to access the cataloged component information via, for example, communications network 14 and the collaborative commerce application. When the prospective buyers find the components for which they are searching, they may be offered the opportunity to purchase the components.

In one suitable approach, the collaborative commerce application may provide users with the ability to access product information (i.e., for components, etc.) by accessing databases maintained by suppliers. For example, a supplier of particular components may maintain a database of information for those components. The collaborative commerce application may seamlessly provide information from the supplier's database to users of the collaborative commerce application via the collaborative commerce's interface.

Clients 16 may be given the ability to access the cataloged component information through the use of any suitable method. In one suitable approach, artificial intelligence functionality may be used by the collaborative commerce application to determine the components that are desired, required, or both for a particular project. For example, each project may have associated with it one or more profiles. There may be one or more profiles associated with each project team member. There may be one or more profiles associated with the project. If desired, there may be both of these types of profiles and any other suitable type of profile. The profiles may contain information regarding preferences for particular component sources, preferences for particular components, budget allocations, and any other suitable information. Profiles for individual project team members may contain personal information such as name, address, telephone numbers, access level (e.g., for ordering components), and any other suitable information. The collaborative commerce application may determine the type of components that a particular project may need at any particular time based, for example, on any or all of the profiles associated with the project and with the project team members. The basis of the collaborative commerce application's component suggestions may also include the current status of the project.

Figure 9:
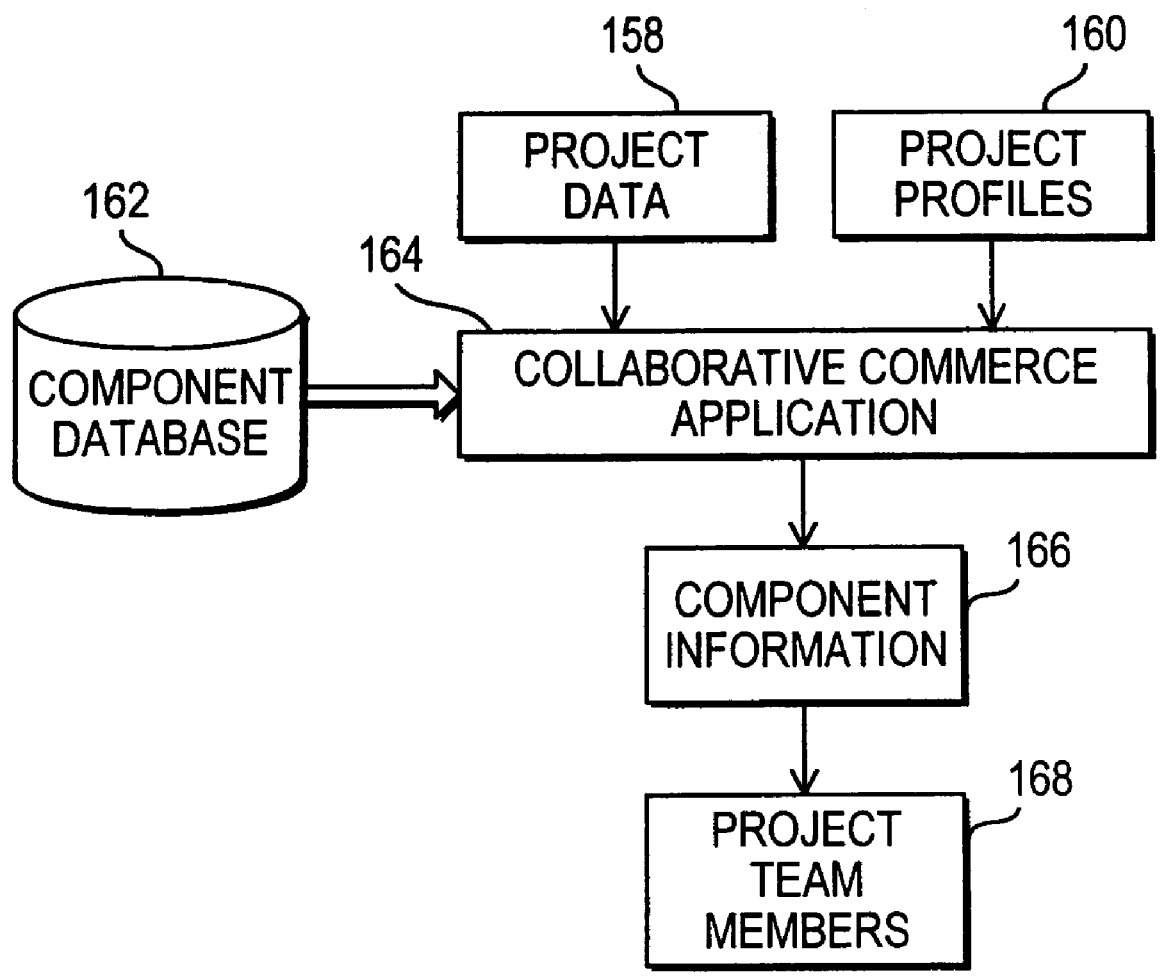
FIG. 9 is a block diagram of an illustrative data flow in accordance with one embodiment of the present invention.

FIG. 9 illustrates this flow of information. Project data 158 and project profiles 160 may be used by collaborative commerce application 164 in conjunction with component database 162. Using these resources, collaborative commerce application 164 may determine suitable component information 166 to provide to appropriate project team members 168.

In another suitable embodiment of the present invention, the collaborative commerce application may enable project team members to manually find components, manufacturers, distributers, etc. For example, the collaborative commerce application may provide search functionality, whereby clients 16 may be given the ability to use any suitable search techniques to find, research, and procure any components associated with the design, construction, and maintenance of fluid processing plants. In one suitable approach, clients may provide search terms (e.g., by having personnel enter the terms in a search field in an interface) that are used as searching criteria in parsing the component database.

FIG. 10 shows an illustrative display screen 165 that may be displayed by the collaborative commerce application. Display screen 165 may provide suitable search functionality. For example, field 167 may be used to perform a search based on corporate or site specification number, corporate or site part number, or both. Field 169 may be used to perform a search based on an any suitable unrestricted keywords. Fields 175 and 173 may be used to perform a search based on supplier part number and manufacturer part number, respectively. These part numbers may be cross-referenced by the collaborative commerce application with corporate and site part numbers. Drop down menu 171 may be used to allow users of the collaborative commerce application to limit searches to specific suppliers, for example. FIG. 10 is merely illustrative. Any other suitable arrangement may be used.

Figure 11A:
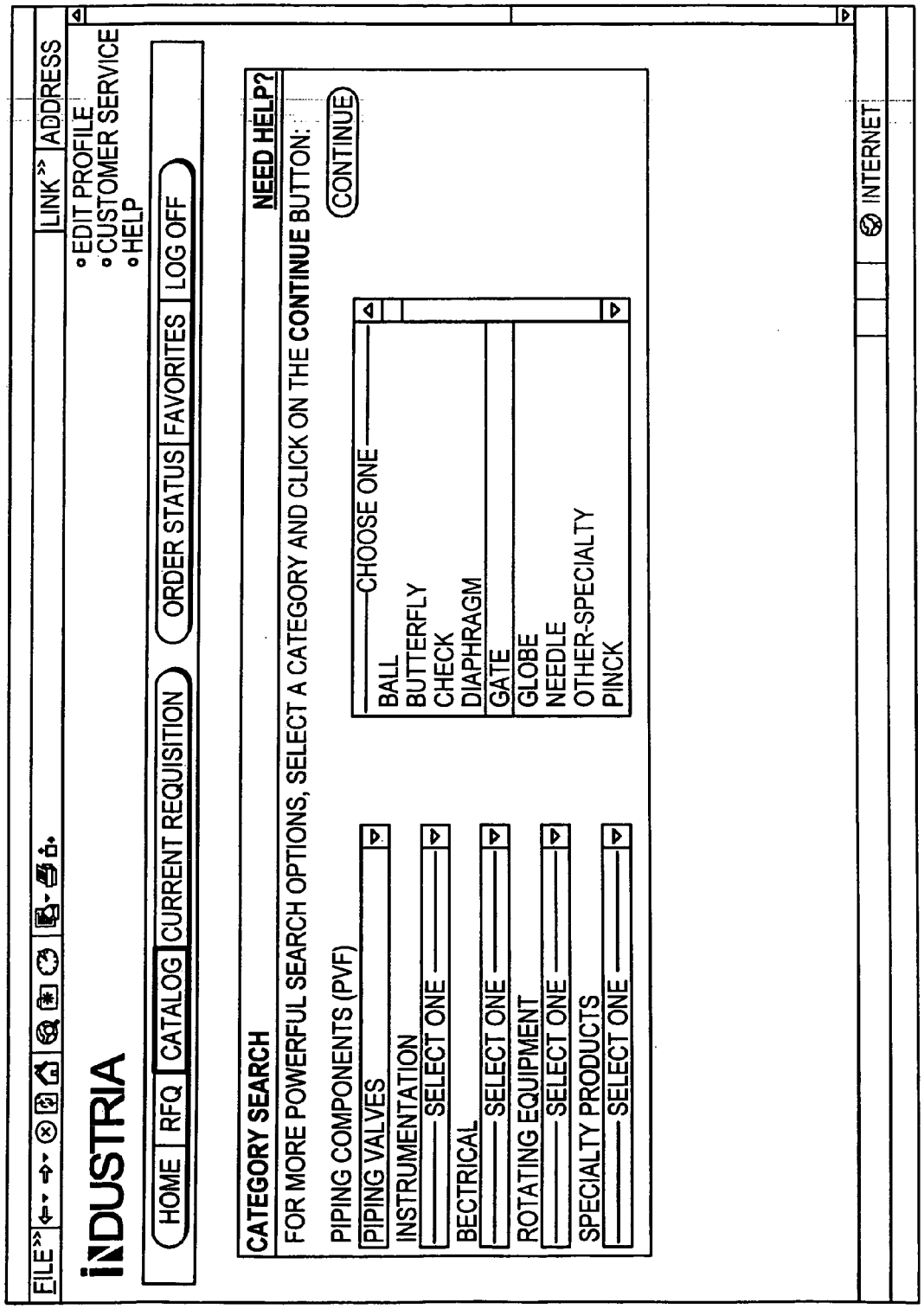

The collaborative commerce application may also provide category search functionality. In one suitable embodiment, customized, detailed interfaces may be displayed by the collaborative commerce application based on, for example, a high-level category selection. FIGS. 11A and 11B illustrate a category search for piping valve gates.

Figure 12A:
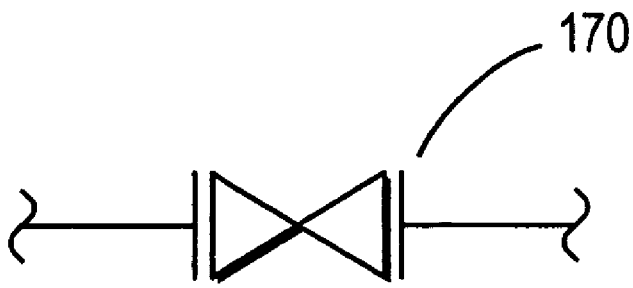
FIG. 12A shows illustrative metadata for a component in accordance with one embodiment of the present invention.

In another suitable approach, metadata may be used as search criteria. For example, when a project team member views, for example, a design of a particular portion of a fluid processing plant, the project team member may select individual parts (as previously described). Each part may have metadata associated with the part. For example, FIG. 12A shows an illustrative part 170 with illustrative metadata 172. Metadata 172 may include any suitable attributes of part 170. Suitable attributes may include part specification, manufacturer or manufacturers, supplier or suppliers, part numbers, or any other suitable attributes.

Project team members may be given the ability to perform a search based on the attributes supplied by the metadata. FIG. 12B shows an illustrative search menu 174 that the collaborative commerce application may provide based on the part selected. Search menu 174 may display metadata attributes 186.

Figure 13:
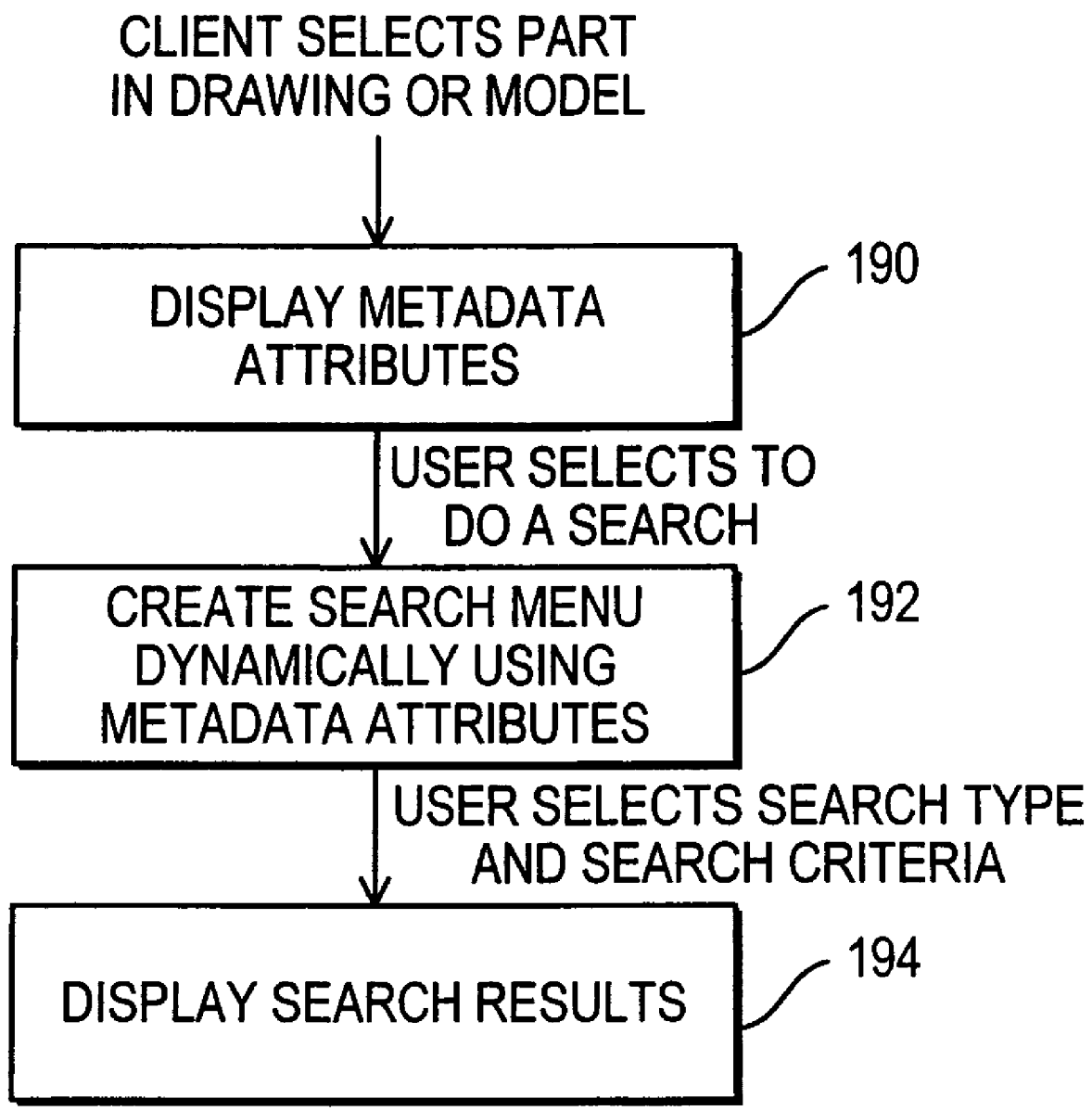
FIG. 13 is a flow chart of illustrative steps involved in using metadata attributes in searching for components in accordance with one embodiment of the present invention.

FIG. 13 is a flow chart of the illustrative steps just described. When a client selects a part from, for example, a two-dimensional drawing or a three-dimensional model, then the collaborative commerce application may display metadata attributes that correspond to the select part at step 190. This is merely an illustrative way in which the metadata attributes may be accessed. Any other suitable way may be used, such as the user selecting a part from a list of parts. The user may be given the ability to perform a search for the selected part, and if the user chooses to do so, the collaborative commerce application may dynamically create a search menu using the metadata attributes. The user may be given the ability to select a search type and the search criteria. The results of the search may be displayed at step 194.

FIG. 14 shows an illustrative search result display screen 196. Any suitable information may be displayed on display screen 196. For example, as illustrated, each component or part listed in display screen 196 may have particular information displayed in various columns. For example, a supplier column 198 may provide supplier information, a product name column 202 may provide product name information, a catalog number column 204 may provide catalog number information, an amount column 206 may provide weight or any other suitable amount information, a price column may provide pricing information, and a quantity column 210 may allow the project team member to specify the quantity desired. These are merely illustrative fields that may be used to display particular information about parts and components. Any other suitable fields may be used in addition to or in place of the those illustrated.

Referring back to FIG. 12B, the collaborative commerce application may provide a dynamic pricing feature 184. Dynamic pricing (box 44 of FIG. 4) may include a request for quote (RFQ), a reverse auction, a traditional type of auction, or any other suitable type of dynamic pricing process.

The collaborative commerce application may provide any suitable functionality for RFQs, reverse auctions, or any other similar type of dynamic pricing process (i.e., with the buyer asking for bids). For example, the collaborative commerce application may provide a "wizard" that may be used to streamline the dynamic pricing process. The wizard may be coupled with a graphic user interface that requests particular information from a requisitioner, an approver, a buyer, and a bidder.

Figure 15:
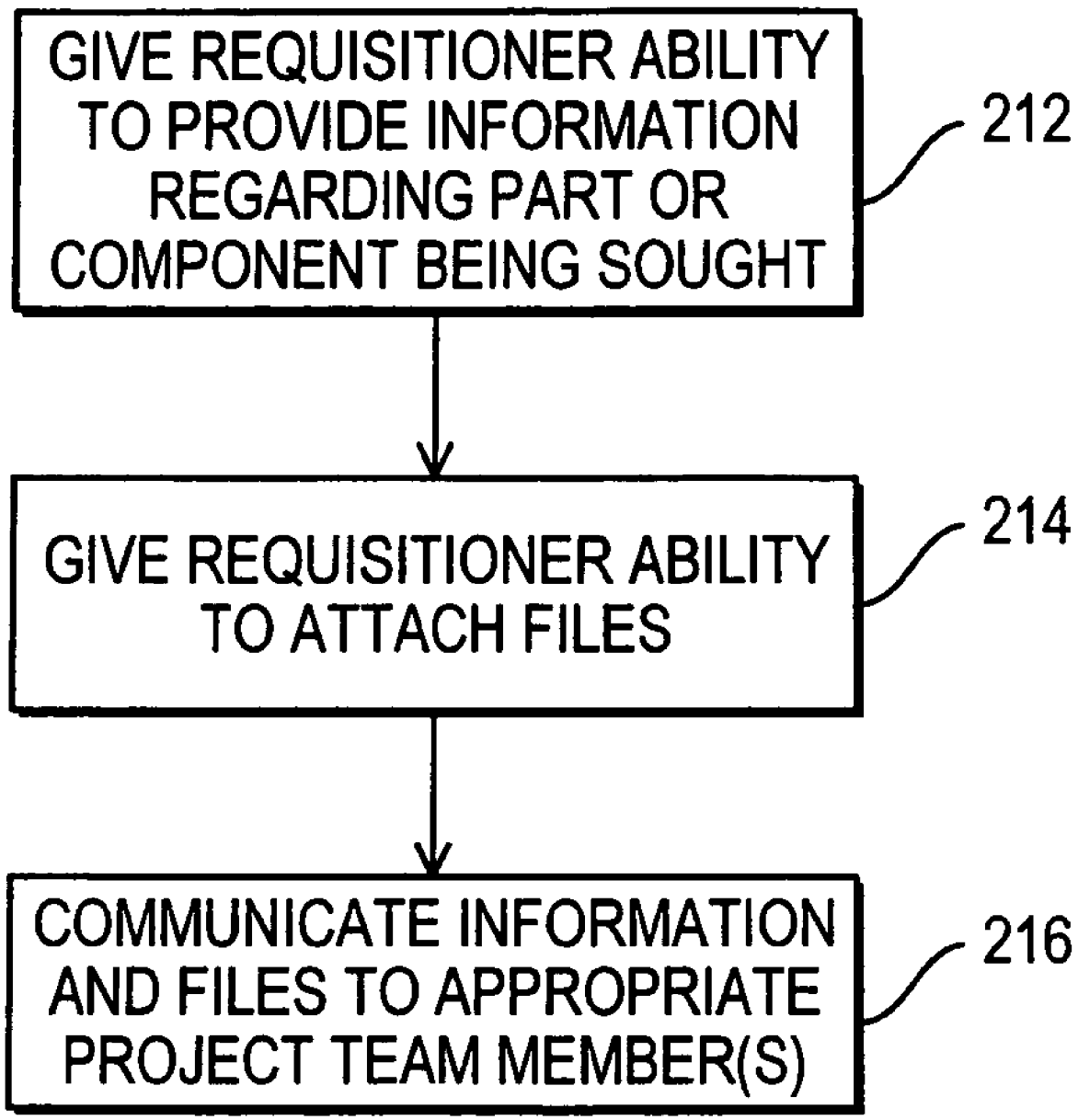
FIGS. 15-18 are flow charts of illustrative steps involved in using the collaborative commerce application for dynamic pricing in accordance with one embodiment of the present invention.

Dynamic pricing may begin with a requisitioner preparing a requisition that is to be communicated to an approver or directly to a buyer. FIG. 15 shows a flow chart of illustrative steps involved in the requisitioning phase. At step 212, the collaborative commerce application may give the requisitioner the ability to provide information regarding the part or component being sought. Information may include a general description of the part or component, the type or category of equipment being sought (e.g., heat exchanger, vessel, or ANSI pump), part or component attributes, a title, or any other suitable information. The wizard may use drop down menus for some of the information that may be provided by the requisitioner. For example, a part or component category may be chosen from a drop down menu. In one suitable approach, attributes may be chosen in the manner that attributes 186 are chosen in FIG. 12B. These are merely illustrative types of information that the requisitioner may be given the ability to provide. The collaborative commerce application may provide the requisitioner with the ability to provide any other suitable information.

At step 214, the requisitioner may be given the ability to attach files to dynamic pricing requisition. For example, the requisitioner may attach files from client 16 to the requisition. In another suitable approach, the requisitioner may provide a links to files stored at central site 12. In yet another suitable approach, the requisition may provide hyperlinks to, for example, World Wide Web pages. Any such suitable attachments may be made to the dynamic pricing requisition.

At step 216, the information and attachments may be communicated to one or more appropriate project team members. In one suitable approach, the project profile may specify that all dynamic pricing requisitions be sent directly to a buyer. In this case, the information and attachment may be directly communicated to a designated buyer. In another suitable approach, the project profile may specify that an approver must review and approve dynamic pricing requisitions. In this case, the information and attachment may be communicated to an approver.

Figure 16:
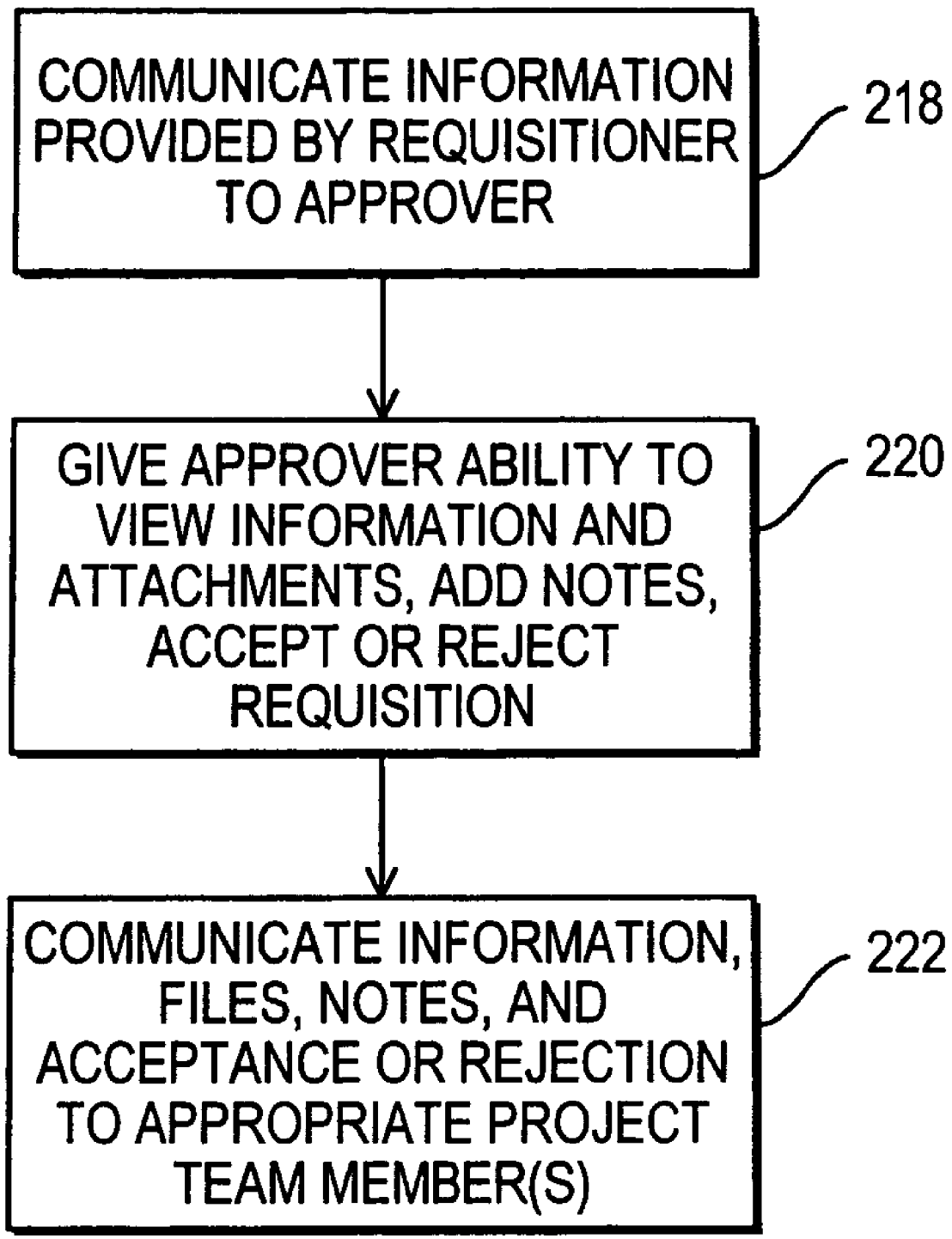

FIG. 16 is a flow chart of illustrative steps involved in an approval phase of a dynamic pricing requisition. At step 218, information and attachments provided by the requisitioner may be communicated to a designated approver by the collaborative commerce application. At step 220, the collaborative commerce application may provide the approver with the ability to view the information and the attachments. The approver may also be provided with the ability to add notes or notations (e.g., further part specifications, budget information, or any other suitable notes or notations). The approver may also be provided with the ability to electronically approve or reject the requisition (e.g., via a checkbox, radio buttons, or via any other suitable interface element). At step 222, the information provided by the requisitioner, the attachments provided by the requisitioner, and any additional notes or notations added by the approver may be forwarded to one or more appropriate project team members (e.g., buyer and requisitioner). In the case that a requisition was not approved, the buyer need not get any communication.

In one suitable embodiment, the approver may be given the ability to specify a list of one or more back-up buyers. For example, in the event that the specified buyer for a particular project or for a particular facet of a project (e.g., as defined by the project profile) is unavailable, then the approver may designate one or more back-up buyers.

Figure 17:
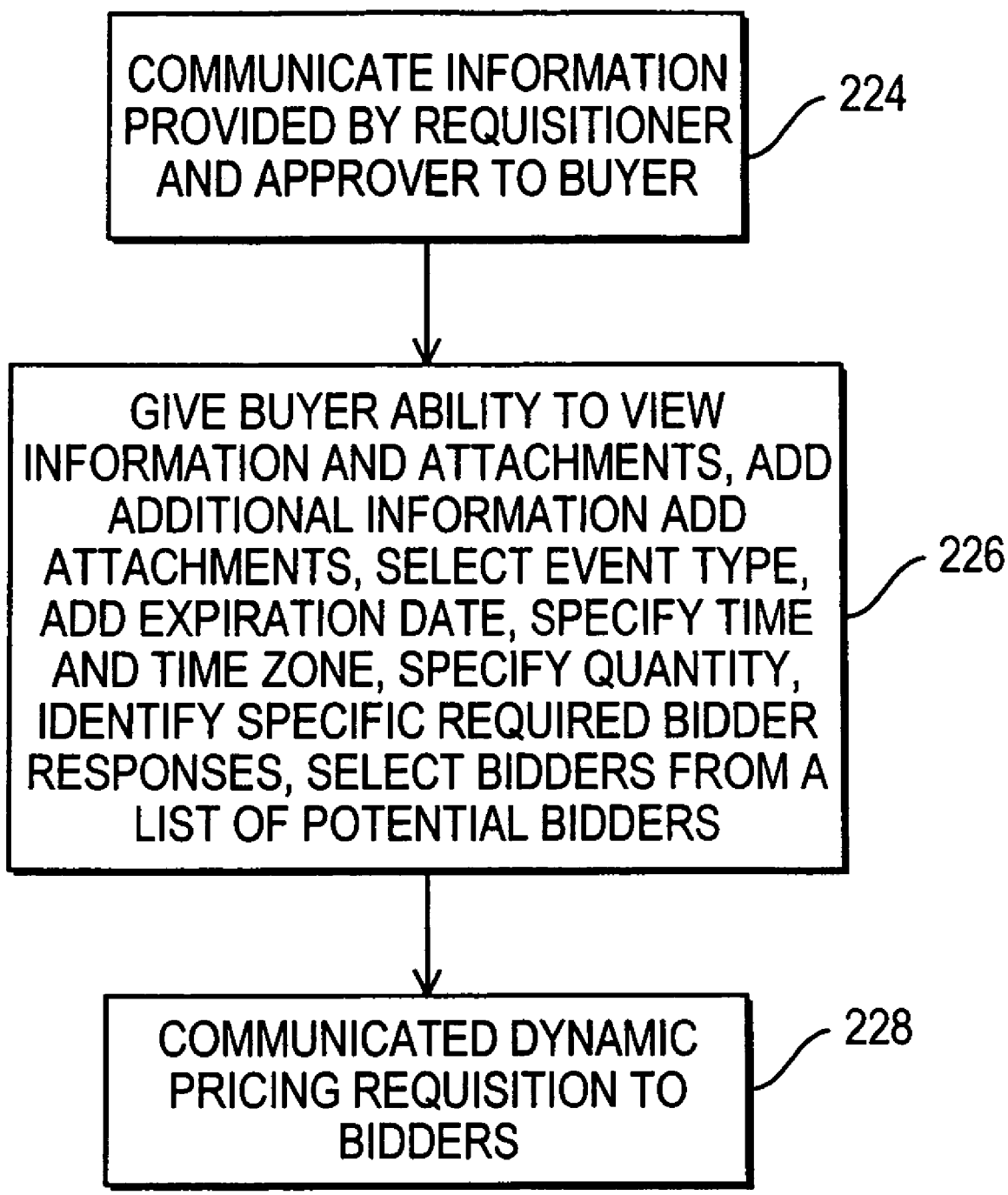

FIG. 17 is a flow chart of illustrative steps involved in the buying phase of the dynamic pricing requisition process. At step 224, the information, notes and notations, and attachments provided by the requisitioner and approver (assuming there was an approval phase) may be communicated to a designated buyer. At step 226, the collaborative commerce application may provide the buyer with the ability to view the information, notes and notations, and attachments. The buyer may also be given the ability to add information, add attachments, select an event type (e.g., RFQ, reverse auction, multistage negotiation, sealed bid, English auction, Dutch auction, Japanese auction, or any other suitable type of dynamic pricing event), add an expiration date, specify time and time zone, specify quantity desired, identify specific required bidder responses (e.g., cash terms, availability, etc.), select bidders from a list of potential bidders, or perform any other suitable action.

At step 228, suitable information and attachments may be communicated to prospective bidders. Bidders may be selected as in step 226 (i.e., selected by the buyer). In another suitable approach, bidders may be automatically selected by the collaborative commerce application, whereby the category or type of the part or component being sought (as provided by the requisitioner) may be used as a basis for determining which bidders are selected. In one suitable approach, the collaborative commerce application may take into account project profiles in determining which bidders to choose. Any such suitable approach for determining which bidders to send the information to may be used.

Figure 18:
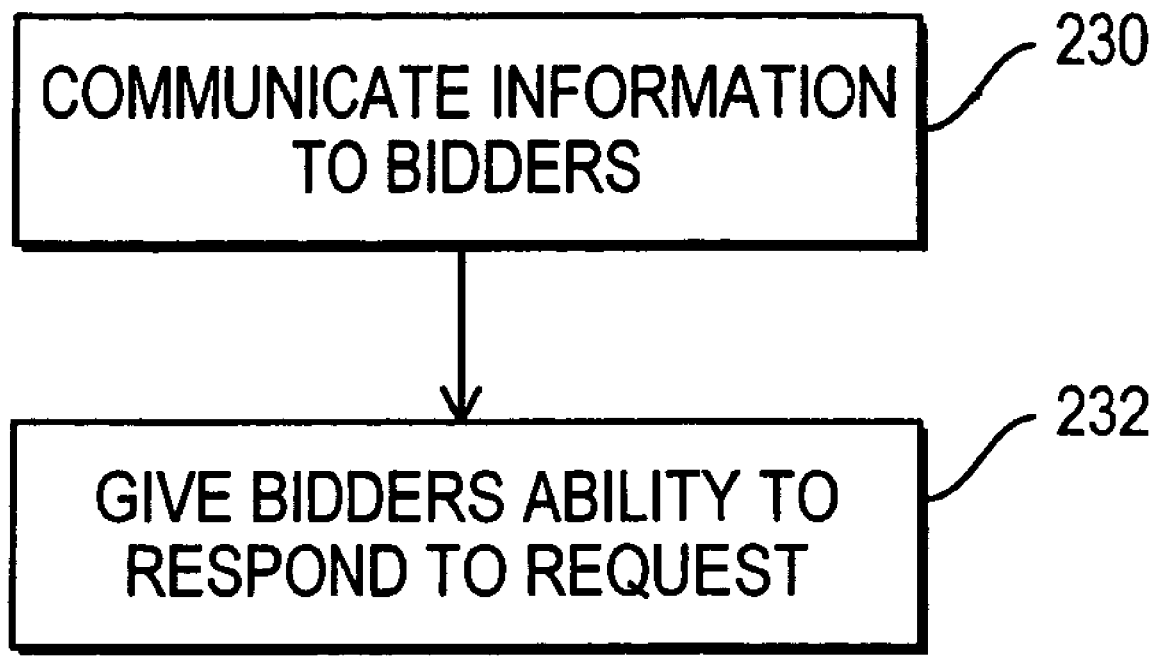

FIG. 18 is a flow chart of illustrative steps involved in the bidding phase of the dynamic pricing process. At step 230, relevant information, including attachments, and any other suitable material may be communicated to bidders. At step 232 the bidders may be provided with the ability to electronically respond to the request. The response may include attachments.

Throughout the dynamic pricing process, the involved parties may receive notifications whenever one of their communication is received by the recipient. For example, when each bidder receives a request, the buyer may receive a notification (e.g., via e-mail) that particular bidder received the request.

In one suitable approach, a bidder's response may not be visible to other bidders. In another suitable approach, only some parts of a bidder's response may be visible to other bidders. Any such privacy feature may be implemented. If desired, the privacy feature may be based on user preferences (e.g., as defined in project profiles).

In one suitable embodiment, when the buyer receives bidders' responses, any required bidder responses that the buyer specified may be automatically tabulated by the collaborative commerce application for comparison and evaluation. If desired, all fields of the responses may be tabulated for comparison and evaluation—not just required responses.

The collaborative commerce application of the present invention may also provide functionality for traditional auctions. For example, suppliers may place any suitable parts or components on auction to solicit bids from any suitable parties (e.g., other suppliers, builders, etc.). A wizard, as previously described, may be used by the supplier to create a new auction and to interact with bidders. Files and links may likewise be attached to a traditional auction as was described for a dynamic pricing event. Any other suitable features for a traditional auction may be used in accordance with the present invention.

Dynamic pricing techniques may be beneficial for parts and components that are not widely available. For parts and components that are commonly available, the collaborative commerce application may provide suitable procurement features that may enable buyers to access updated price information, availability information, supplier information, and any other suitable information for these parts and components. The collaborative commerce application may also provide buyers with the ability to place orders electronically.

The collaborative commerce application may provide to appropriate project team members the ability to view, in an organized and customizable way, the bids and any other suitable data for a dynamic pricing event. FIGS. 19A and 19B show an illustrative display screen 233 that may be displayed by the collaborative commerce application to provide a tabulation of bids. Any suitable information may be displayed in the tabulation of bids. For example, prices, quantities, availability, fees, shipping dates, or any other suitable information may be displayed in the bid tabulation of display screen 233. The bid tabulation may be used to compare the terms being offered by different bidders.

In one suitable approach, information may be organized by the collaborative commerce application in the bid tabulation using optimization tools 234, 235, and 236. For example, optimization tool 234 may organize bids based on lowest price and delivery date. Optimization tool 235 may organize bids based on lowest prices alone. Optimization tool 236 may organize bids based on alternate lowest price and delivery dates taking into account alternate bids. Customization tool 237 may be provided by the collaborative commerce application to allow users to define custom bid organization schemes.

The collaborative commerce application may analyze bid information and indicate a recommended bid based on, for example, how well a particular bid corresponds to project profiles. Display screen 233 shows bid 239 as being indicated to be a recommended bid.

The collaborative commerce application may allow users to make any suitable annotations to bids in the bid tabulation. For example, a checkbox 238 may be provided that may allow users to indicate whether a particular bid is technically acceptable.

The collaborative commerce application may provide bidders with the ability to submit alternate bids (e.g., having a different price for a different quantity). The collaborative commerce application may also provide buyers with the ability to view alternate bids. Display screen 233 (FIG. 19B) shows alternate bid 311 for a particular bidder. The alternate bid may provide the same type of information as the original bid, but may have different parameters.

The bid tabulation may also provide an approval workflow 310 that may detail the chain of approvals for a particular requisition.

In one suitable embodiment of the present application, change order processing features may be implemented in the collaborative commerce application. Change order processing may include the ability to have buyers, bidders, or any other suitable entities change information that was previously submitted. For example, orders may be changed or cancelled.

When a user wishes to change an order, such as a request for quote, requisition, or any other suitable type of order, the collaborative commerce application may provide the user with the ability to initiate any desired changes, from, for example, an order status display screen. The ability to change an order may be provided from any other suitable location in the interface of the collaborative commerce application.

When activated, the order change feature of the collaborative commerce application may provide an editable copy of the order. The editable copy of the order may include additional fields that may be used to specify changes being made.

Figure 20A:
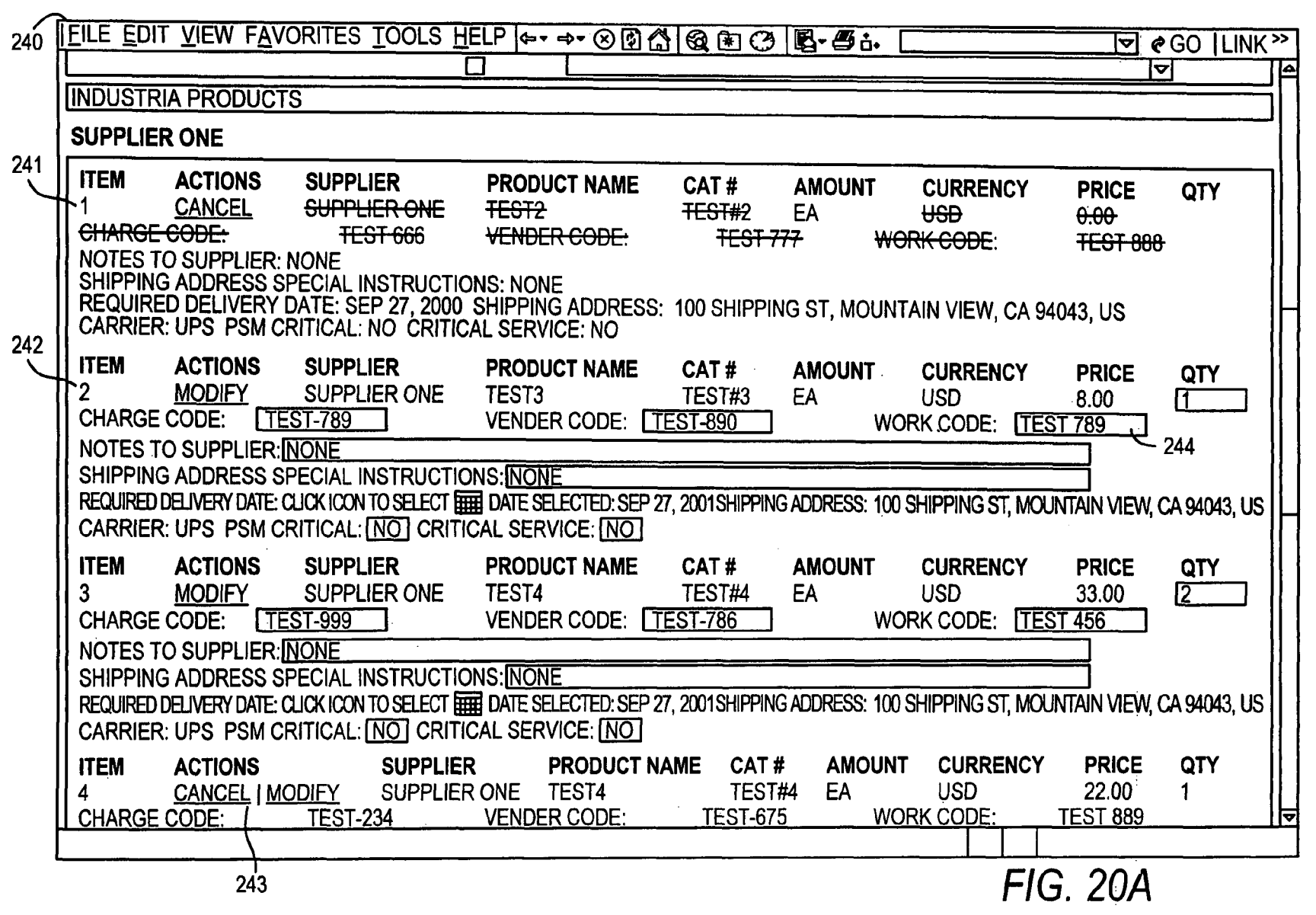

FIG. 20A shows an illustrative display screen 240 that may be displayed by the collaborative commerce application for order cancellations and modifications. Item 241 is shown to be cancelled. The cancellation may be indicated by the redlining. More particularly, a strikethrough appearance may be generated by the collaborative commerce application over the content of fields corresponding to the cancelled order. This is merely an illustrative way of indicating an order cancellation. Any other suitable indication may be used.

Redlining may be used to indicate order modification. That is, any suitable indicators may be used to identify previous information (e.g., field contents) and to identify new information.

In another suitable approach, modification may be made by having the collaborative commerce application provide users with the ability to change information without the use of redlining. For example, as shown in display screen 240, the order for item 242 is being modified. In the illustrated case, the collaborative commerce application may provide editable fields, such as field 244, that the user may use to make changes to the order for item 242.

When modifications are submitted, the collaborative commerce application may display a display screen such as display screen 244 of FIG. 20B. Display screen 244 may display an audit trail 245 that may be indicate any modifications and cancellations made to prior or pending orders.

Display screen 240 and 244 are merely illustrative. Any other suitable arrangement may be used and any other suitable information may be displayed. For example, revision numbers may be displayed for orders that have been modified or cancelled. Any such information may be displayed. Any additional fields may be provided by the collaborative commerce application. For example, additional user-editable fields may be provided for approving changes, for providing special instructions, or for any other suitable purpose related to order modification or cancellation.

In one suitable approach, a cancellation need not result in an order being deleted from the system. In this situation, the cancelled order may be archived as a revised order. This may allow the order to be reactivated at a later date if the cancellation was a mistake or was done to postpone the order. Although a cancellation may be made, the collaborative commerce application may process payment for orders that are partially complete at the time of cancellation (e.g., if the supplier has almost completed fabrication of a vessel, a cancellation fee is imminent).

Changing and cancelling orders may be done by authorized project team members for a particular project. For example, in one suitable approach, the collaborative commerce application may only allow the requisitioner of a particular order to change or cancel the order. In another suitable approach, approvers of the order being changed or cancelled may be given the authorization to change or cancel the order. Any such suitable designation of authority may be given. If desired, such designation may be determined by appropriate project team members and specified in the project profiles.

In one suitable embodiment of the collaborative commerce application of the present invention, when an order is changed or cancelled, appropriate project team members, and appropriate sellers (i.e., who were supposed to supply the order) may be notified of the changes or cancellation by the collaborative commerce application. In one suitable approach, the information communicated to different project team members and sellers may be based on the identity of the recipient. For example, the sellers may receive information regarding the changes to the specification of the product being ordered. The project team leaders may receive information on all facets of the order change, including, for example, any additional notes, reasons for changes, etc. The notification may take any suitable form as previously described herein.

The collaborative commerce application may provide project team members with the ability to review the history of the orders. For example, a project team member may be allowed to access the status of all pending and prior orders related to a particular project.

FIG. 21 shows an illustrative order status display screen 250 that may be provided by the collaborative commerce application. Display screen 250 may display a listing 258 of all pending orders for a particular project. Each listing may provide any suitable information about the corresponding order. For example, as illustrated in display screen 250, an order number information 251, number of revisions information 252, and order title 254 may be provided. Any other suitable information may be provided about pending or prior orders.

In one suitable approach, the collaborative commerce application may provide users with the ability to change a particular order or to perform any other suitable activity on a particular order. Activities may be displayed in a drop-down menu such as drop-down menu 256. Any suitable activities may be performed on one or more particular orders. Selecting a particular order may cause the collaborative commerce application to display additional information about the selected order. For example, selecting a particular order may cause the collaborative commerce application to display a history of the selected order, including any revisions made. Any such suitable information about a pending or prior order may be displayed by the collaborative commerce application.

In one suitable approach, the collaborative commerce application may provide to sellers a display screen that may be similar to display screen 250. Sellers may be given the ability to view orders that are to be filled, orders that have been filled, or both. Additional information about a particular order may be provided to sellers upon selection of the order.

In one suitable embodiment of the collaborative commerce application of the present invention, inspection and certification may be provided electronically (box 52 of FIG. 4). For example, the certification information for a fluid processing plant may be electronically filed and accessible via the collaborative commerce application. Certification information may include, for example, review of fabrication history for five years (or any other suitable period of time), review of code stamps and employee training records, review of the level of customer satisfaction for the manufacturers of equipment, parts, and components used in the fluid processing plant, the quality assurance practices of the manufacturers of equipment, parts, and components used in the fluid processing plant, certified inspectors' notes made during a walk-through of the facility, and any other suitable information that a user may request.

Figure 22:
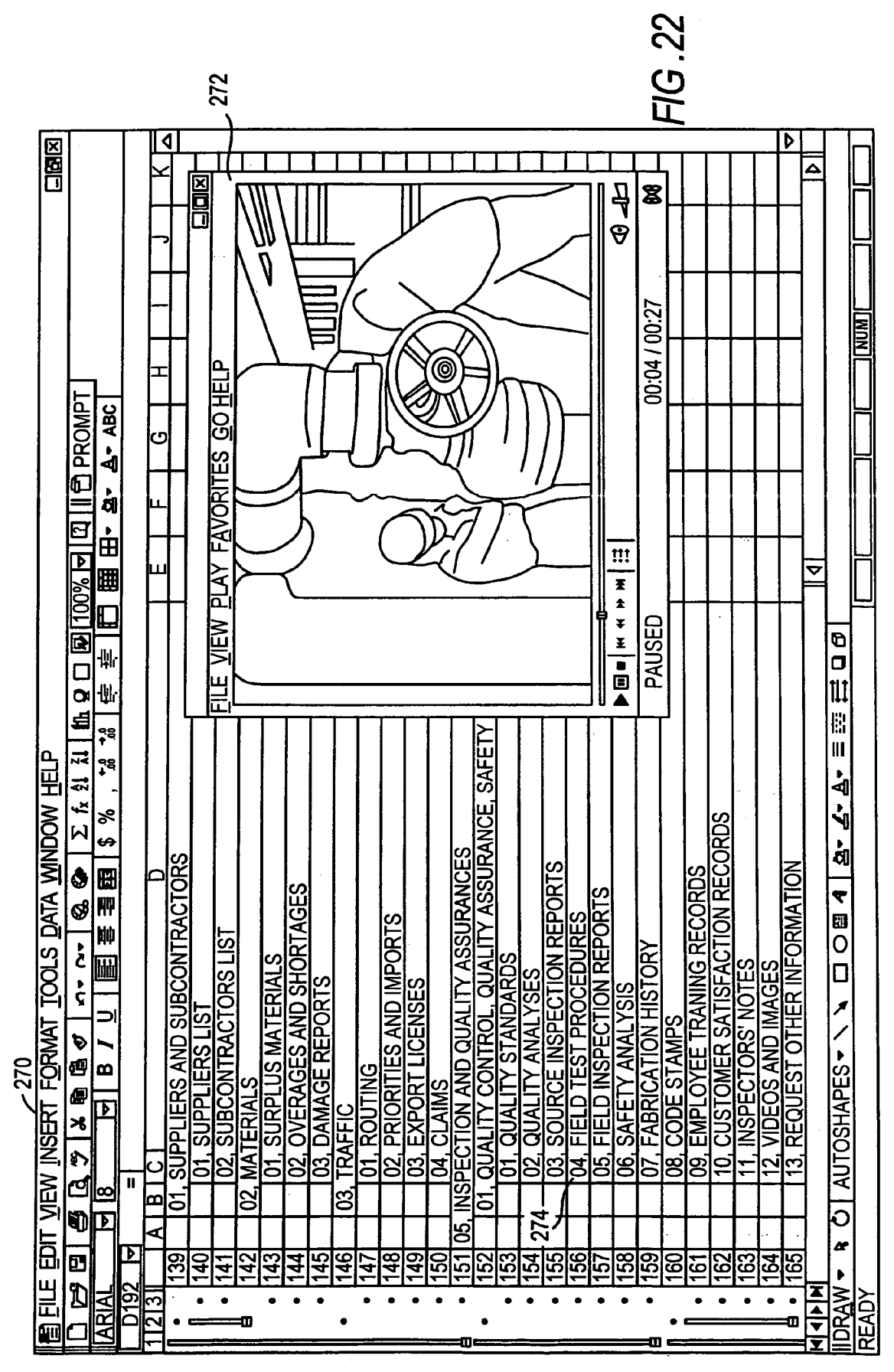

FIG. 22 shows an illustrative display screen 270 that the collaborative commerce application may provide to project team members or any other suitable entity. Display screen 270 may be used to allow users to access inspection and certification information for a particular manufacturer. For example, in the illustrated case, the collaborative commerce application provides access to inspection and quality assurances 274. These may include quality standards, quality analyses, source inspection reports, field test procedures, field inspection reports, safety analysis, fabrication history, code stamps, employee training records, customer satisfaction records, inspectors' notes, videos and images, or any other suitable information. In one suitable approach, the collaborative commerce application may also provide users with the ability to request other particular information. This is merely an illustrative arrangement and array of choices. Any other suitable information may be provided using any other suitable arrangement.

In one suitable embodiment, the collaborative commerce application may provide users with the ability to view video of a facility walkthrough, video of actual fabrication processes being performed, video of inspections being performed, or any other suitable video. Other forms of content may be used in addition to or in place of video. For example, any suitable images or video clips may be used. Streaming video may be used. Videos with or without sound may be used.

Display screen 270 shows video 272. Video 272 may be any suitable video related to the inspection and certification of a particular manufacturer, including, for example, facility walkthroughs, manufacturing processes, or any other suitable events. Video 272 is not limited to prerecorded video. For example, video 272 may include a live video feed, a slide show of images, or any other suitable graphics-based content.

The collaborative commerce application may therefore be used by project teams to certify particular manufacturers for use in one or more particular projects. That is, particular manufacturers may be designated as certified for particular project based on information that may be provided by the collaborative commerce application. Project team members may designate certified manufacturers via the collaborative commerce application. The certified manufacturers may be placed in project profiles for use with features described herein (e.g., dynamic pricing requests).

The collaborative commerce application may provide notifications (via, for example, e-mail, instant messaging, or any other suitable form of communication) to suitable project team members whenever a manufacturer that is certified with associated projects suffers a serious quality incident at its facility. A notification may also be communicated to suitable project team members if a certified manufacturer's processes are no longer in control based on, for example, statistical process control charts. Notifications may also be communicated in the event that training records or code stamps are no longer valid for a certified manufacturer's facility. These are merely illustrative examples of triggers that may cause the collaborative commerce application to communicate notifications to suitable project team members. Any other suitable triggers may cause the communication of notifications to suitable project team members.

Figure 23:
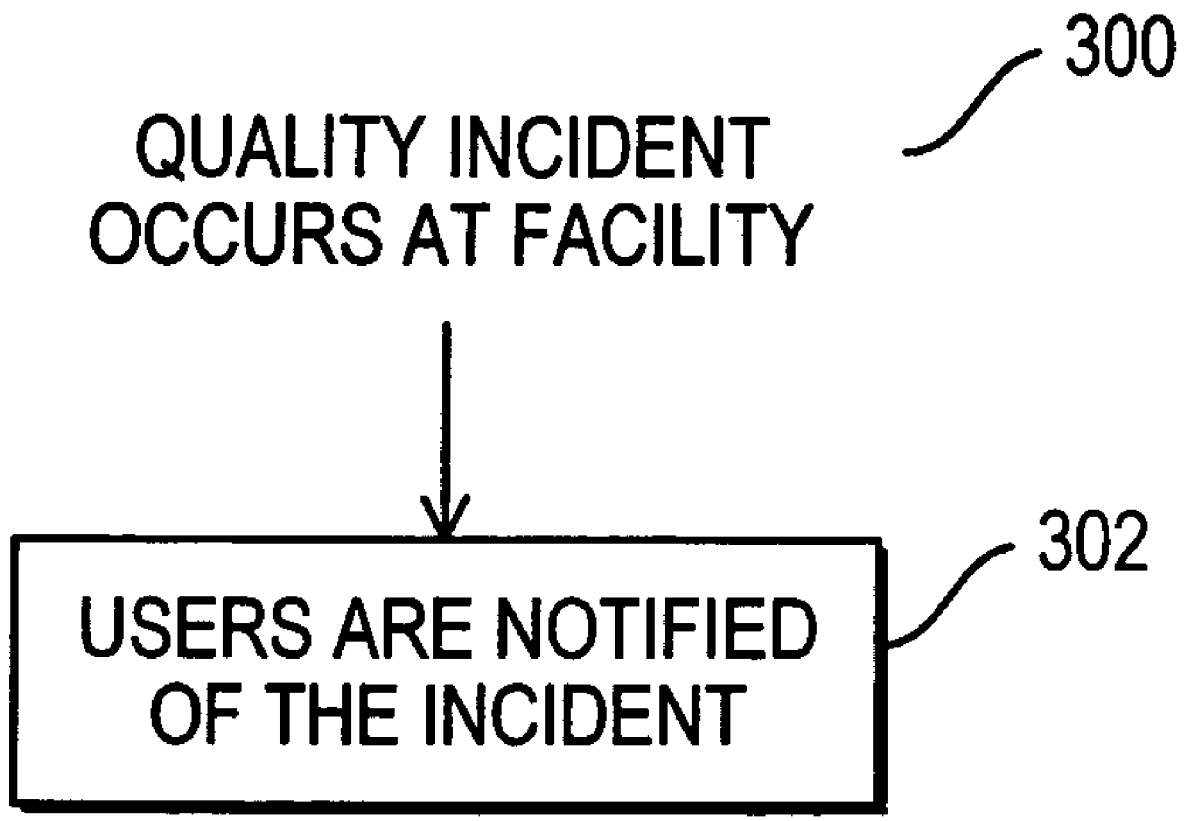
FIG. 23 is a flow chart of illustrative steps involved in the notification of quality incidents in accordance with one embodiment of the present invention.

FIG. 23 is a flow chart of illustrative steps involved in notifying users of the collaborative commerce application in the event of a quality incident at a manufacturer's facility. When, at step 300, a quality incident (e.g., as described above) occurs at a facility, then at step 302 the collaborative commerce application may notify appropriate users of the occurrence.

The collaborative commerce application may provide users with the ability to perform a search of ongoing projects for inspection and certification purposes. That is, by observing the progress (or lack thereof) being made by a particular manufacturer in ongoing projects, a decision for whether that manufacturer should be certified for a particular project may be made. Security features may be implemented, whereby the information provided to users with regard to other projects may be based on, for example, code or password protection.

Assuming security is satisfied, users may be provided with any suitable certification and inspection information. For example, final pass and route pass x-rays may be provided for welding projects. In addition, mill certifications, final inspection written reports, fabrication update video, or any other information may be provided by the collaborative commerce application.

All of the certification and inspection information for a particular manufacturer may be stored at central site 12 (FIG. 1A). The information may be accessed by any suitable entities. For example, potential customers of the manufacturer may be given the ability to access the information. In another suitable approach, certification and inspection information for a particular manufacturer may be stored at a database that is not located at central site 12. The collaborative commerce application may be used to access the other database via, for example, communications network 14. In the case of critical or large files, such as x-rays, communication of the files may be made through the use of wireless satellite linkup, or through the use of any other suitable bandwidth-on-demand technique.

Figure 24:
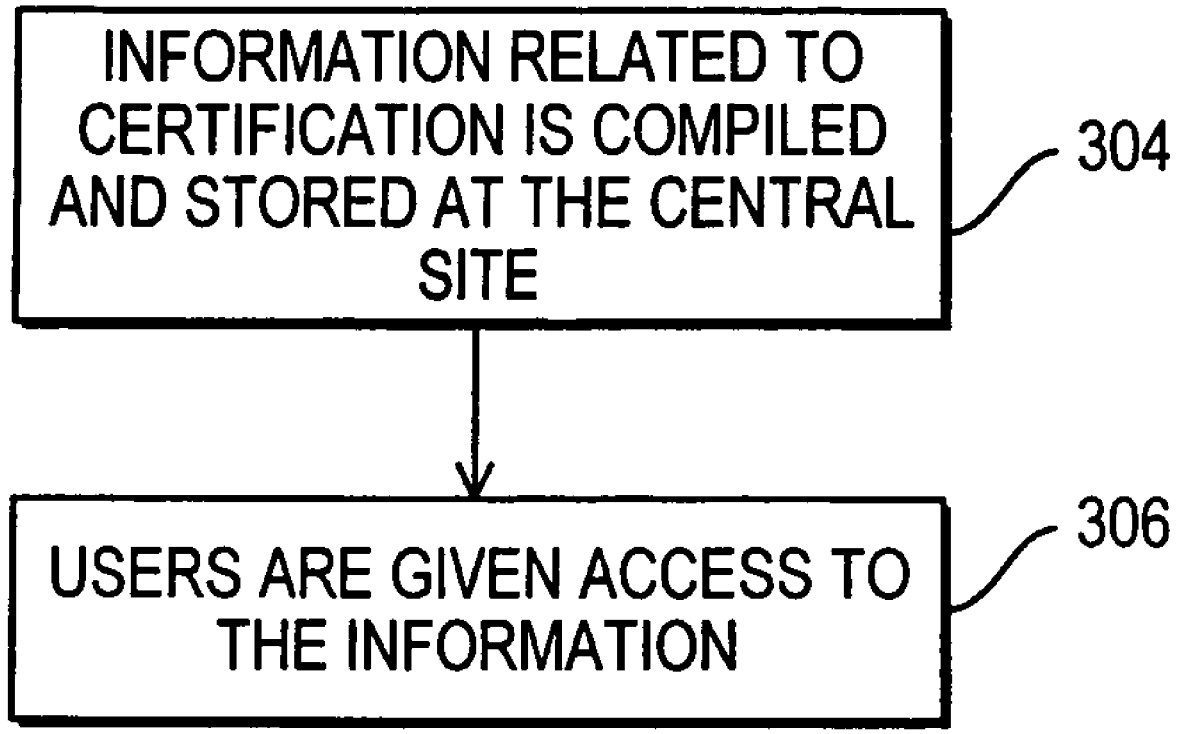
FIG. 24 is a flow chart of illustrative steps involved in providing certification information in accordance with one embodiment of the present invention.

FIG. 24 is a flow chart of illustrative steps involved in providing information related to certification. At step 304, information related to certification may be compiled and stored at central site 12, using, for example, the collaborative commerce application.

Thus, Internet-based collaborative commerce for the design, construction, and maintenance of fluid processing plants systems is provided. One skilled in the art will realize that the present invention can be practiced by other than the described embodiments, which are presented for purposes of illustration and not of limitation, and that the present invention is limited only by the claims which follow.

What is claimed is:

1. A computerized method for using a collaborative commerce application to provide a user with information associated with a first component that is part of a second component of a fluid processing plant, comprising:

in a first computer process executed by a computer processor, displaying a two-dimensional drawing of the second component on a display at a client site, wherein the first component is included in the two-dimensional drawing, and wherein data used to display the two-dimensional drawing is stored at a central site in a computer aided design format for a three-dimensional graphical model;

in a second computer process executed by the computer processor, providing the user with the ability to select a portion of the two-dimensional drawing that is associated with the first component; and in a third computer process executed by a computer processor, displaying the information associated with the first component on the display, wherein the information associated with the first component is stored at the central site and includes information associated with the three-dimensional graphical model, and wherein displaying the information further comprises selectively displaying information selected from a group consisting of a two-dimensional graphical model, a three-dimensional graphical model, text, a bill of materials, and any combination thereof.

2. The method of claim 1 further comprising, in a fourth computer process executed by the computer processor, displaying a three-dimensional graphical model of the second component along with the two-dimensional drawing on the display at the client site.

3. The method of claim 1 further comprising providing the user with the ability to edit the information.

4. The method of claim 1 further comprising providing the user with the ability to redline the information.

5. The method of claim 1 further comprising providing the user with the ability to edit the two-dimensional drawing.

6. The method of claim 1 further comprising providing the user with the ability to redline the two-dimensional drawing.

7. A system for using a collaborative commerce application to provide a user with information associated with a first component that is part of a second component of a fluid processing plant, the system configured to: display a two-dimensional drawing of the second component on a display at a client site, wherein the first component is included in the two-dimensional drawing, and wherein data used to display the two-dimensional drawing is stored at a central site in a computer aided design format for a three-dimensional graphical model; provide the user with the ability to select a portion of the two-dimensional drawing that is associated with the first component; and display the information associated with the first component on the display, wherein the information associated with the first component is stored at the central site and includes information associated with the three-dimensional graphical model, and wherein displaying the information further comprises selectively displaying information selected from a group consisting of a two-dimensional graphical model, a three-dimensional graphical model, text, a bill of materials, and any combination thereof.

8. The system of claim 7 wherein the system is further configured to display a three-dimensional graphical model of the second component along with the two-dimensional drawing on the display at the client site.

9. The system of claim 7 further configured to provide the user with the ability to edit the information.

10. The system of claim 7 further configured to provide the user with the ability to redline the information.

11. The system of claim 7 further configured to provide the user with the ability to edit the two-dimensional drawing.

12. The system of claim 7 further configured to provide the user with the ability to redline the two-dimensional drawing.

13. A system for using a collaborative commerce application to provide a user with information associated with a first component that is part of a second component of a fluid processing plant, comprising:
   means for displaying a two-dimensional drawing of the second component on a display at a client site, wherein the first component is included in the two-dimensional drawing, and wherein data used to display the two-dimensional drawing is stored at a central site in a computer aided design format for a three-dimensional graphical model;
   means for providing the user with the ability to select a portion of the two-dimensional drawing that is associated with the first component; and
   means for displaying the information associated with the first component on the display, wherein the information associated with the first component is stored at the central site and includes information associated with the three-dimensional graphical model, and wherein displaying the information further comprises selectively displaying information selected from a group consisting of a two-dimensional graphical model, a three-dimensional graphical model, text, a bill of materials, and any combination thereof.

14. The system of claim 13 further comprising:
   means for providing the user with the ability to edit at least one of the information and the two-dimensional drawing.

15. The system of claim 13 further comprising:
   means for providing the user with the ability to redline at least one of the information and the two-dimensional drawing.

* * * * *